(12) United States Patent
Gupta et al.

(10) Patent No.: US 10,706,014 B1
(45) Date of Patent: Jul. 7, 2020

(54) STORAGE SYSTEM GARBAGE COLLECTION AND DEFRAGMENTATION

(71) Applicant: Cohesity, Inc., San Jose, CA (US)

(72) Inventors: Anubhav Gupta, Sunnyvale, CA (US); Anirvan Duttagupta, San Jose, CA (US)

(73) Assignee: Cohesity, Inc., San Jose, CA (US)

( * ) Notice: Subject to any disclaimer, the term of this patent is extended or adjusted under 35 U.S.C. 154(b) by 0 days.

(21) Appl. No.: 16/279,780

(22) Filed: Feb. 19, 2019

(51) Int. Cl.
*G06F 17/30* (2006.01)
*G06F 16/17* (2019.01)
*G06F 16/901* (2019.01)
*G06F 3/06* (2006.01)
*G06F 12/02* (2006.01)
*G06F 16/182* (2019.01)
*G06F 16/908* (2019.01)

(52) U.S. Cl.
CPC ........ *G06F 16/1724* (2019.01); *G06F 3/0604* (2013.01); *G06F 3/0643* (2013.01); *G06F 3/0683* (2013.01); *G06F 12/0253* (2013.01); *G06F 16/182* (2019.01); *G06F 16/908* (2019.01); *G06F 16/9027* (2019.01)

(58) Field of Classification Search
CPC .............. G06F 16/1724; G06F 16/182; G06F 16/9027; G06F 16/908; G06F 3/0604; G06F 3/0643; G06F 3/0683; G06F 12/0253
See application file for complete search history.

(56) References Cited

U.S. PATENT DOCUMENTS

| | | | |
|---|---|---|---|
| 8,788,778 B1* | 7/2014 | Boyle | G06F 12/0253 711/155 |
| 9,594,674 B1* | 3/2017 | Mondal | G06F 12/0269 |
| 2008/0281908 A1* | 11/2008 | McCanne | H04L 67/06 709/203 |
| 2013/0166818 A1* | 6/2013 | Sela | G06F 12/0246 711/103 |
| 2017/0031597 A1* | 2/2017 | Bulkowski | G06F 3/0604 |
| 2017/0220623 A1* | 8/2017 | Blount | G06F 12/0269 |
| 2018/0024751 A1* | 1/2018 | Bandic | G06F 3/0688 711/103 |
| 2018/0165022 A1* | 6/2018 | Tomic | G06F 11/34 |
| 2018/0307417 A1* | 10/2018 | Dubeyko | G06F 12/023 |

* cited by examiner

*Primary Examiner* — Jared M Bibbee
(74) *Attorney, Agent, or Firm* — Van Pelt, Yi & James LLP

(57) ABSTRACT

Metadata of each file of a group of files of a storage and chunk file metadata are analyzed to identify one or more file segment data chunks that are not referenced by the group of files of the storage. Fragmented chunk files to be combined together are identified based at least in part on the one or more identified file segment data chunks. The chunk file metadata is updated with an update that concurrently reflects the removal of at least a portion of the one or more file segment data chunks that are not referenced by the group of files and the combination of the identified fragmented chunk files.

19 Claims, 21 Drawing Sheets

400 ⟶

| Brick ID | Chunk ID | Chunk File ID |
|---|---|---|
| Brick 1 | SHA-1$_a$ | Chunk File 1 |
| Brick 2 | SHA-1$_b$ | Chunk File 2 |
| ... | ... | ... |
| Brick n | SHA-1$_n$ | Chunk File n |

| Chunk File ID | Chunk ID | Chunk File Offset | Storage Node | Primary Owner |
|---|---|---|---|---|
| Chunk File 1 | SHA-1$_a$ | 0 – 256 kb | 1, 3 | File 1 |
| Chunk File 1 | SHA-1$_b$ | 256 kb – 512 kb | 2, 4 | File 1 |
| ... | ... | ... | ... | ... |
| Chunk File n | SHA-1$_n$ | 0 – 256 kb | 1, 3 | File n |

F1: 701 Chunk 1 | 702 Chunk 2 | 703 Chunk 3 | 704 Chunk 4 | 705 Chunk 5 | 706 Chunk 6 | 707 Chunk 7 | 708 Chunk 8
F2: 711 Chunk 11 | 712 Chunk 12 | 713 Chunk 13 | 714 Chunk 14 | 715 Chunk 15 | 716 Chunk 16 | 717 Chunk 17 | 718 Chunk 18
F3: 721 Chunk 21 | 722 Chunk 22 | 723 Chunk 23 | 724 Chunk 24 | 725 Chunk 25 | 726 Chunk 26 | 727 Chunk 27 | 728 Chunk 28

F1: 701 Chunk 1 | 702 Chunk 2 | 703 Chunk 3 | 704 Chunk 4 | 705 Chunk 5 | 706 Chunk 6 | 707 Chunk 7 | 708 Chunk 8
F2: 711 Chunk 11 | 712 Chunk 12 | 713 Chunk 13 | 714 Chunk 14 | 715 Chunk 15 | 716 Chunk 16 | 717 Chunk 17 | 718 Chunk 18
F3: 721 Chunk 21 | 722 Chunk 22 | 723 Chunk 23 | 724 Chunk 24 | 725 Chunk 25 | 726 Chunk 26 | 727 Chunk 27 | 728 Chunk 28

F123: 701 Chunk 1 | 703 Chunk 3 | 705 Chunk 5 | 707 Chunk 7 | 712 Chunk 12 | 715 Chunk 15 | 718 Chunk 18 | 728 Chunk 28

775

US 10,706,014 B1

STORAGE SYSTEM GARBAGE COLLECTION AND DEFRAGMENTATION

BACKGROUND OF THE INVENTION

Garbage collection of a storage system may include a process by which orphaned storage objects that are no longer in use are removed from storage. Defragmentation may include a process of identifying noncontiguous fragments of associated data and rearranging the fragments to be contiguous. A storage system may store a large amount of files and data associated with the files. Traversing the entire storage to perform garbage collection and then traversing the storage again to perform defragmentation often takes a large amount of time and computing resources to perform.

BRIEF DESCRIPTION OF THE DRAWINGS

Various embodiments of the invention are disclosed in the following detailed description and the accompanying drawings.

FIG. 4A is a diagram illustrating an embodiment of a chunk metadata table.

FIG. 4B is a diagram illustrating an embodiment of a chunk metadata table.

FIG. 7A is a diagram illustrating a plurality of chunk files in accordance with some embodiments.

FIG. 7B is a diagram illustrating a plurality of chunk files in accordance with some embodiments.

FIG. 7C is a diagram illustrating a combined chunk file in accordance with some embodiments.

DETAILED DESCRIPTION

Figure 1:
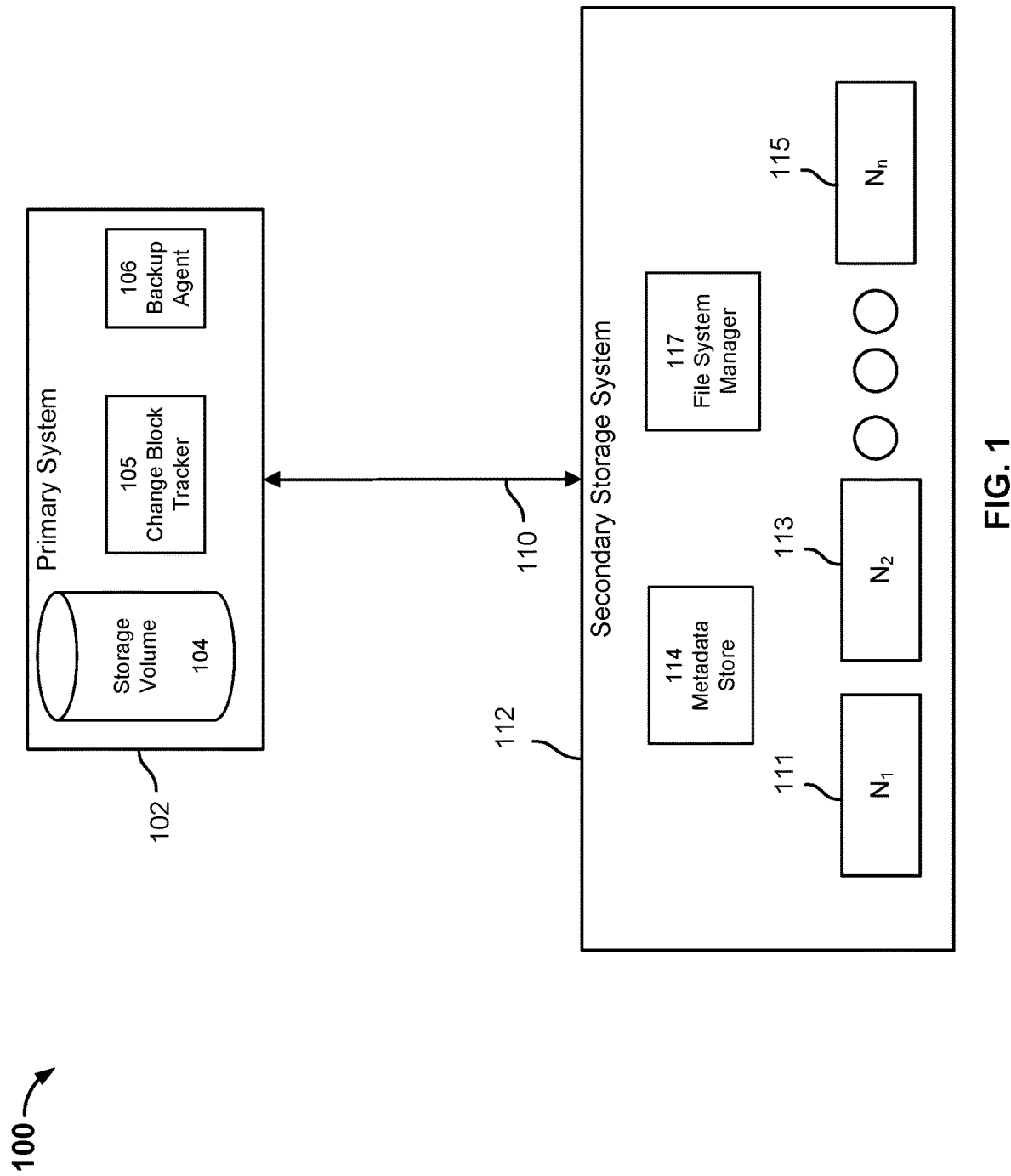
FIG. 1 is a block diagram illustrating an embodiment of a storage system for garbage collection and defragmentation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A primary system is comprised of file system data. The file system data includes a plurality of files (e.g., content files, text files, etc.) and metadata associated with the plurality of files. The primary system may perform a backup snapshot of the file system data and send the backup snapshot to a secondary storage system. A backup snapshot may represent the state of the primary system at a particular point in time. A backup snapshot may be a full backup snapshot or an incremental backup snapshot. A full backup snapshot includes the entire state of the primary system at a particular point in time. An incremental backup snapshot includes the state of the primary system that has changed since a last backup snapshot.

A secondary storage system may be comprised of a plurality of nodes (e.g., storage cluster). The secondary storage system may ingest and store the data of the backup snapshot across the plurality of nodes. A file system manager associated with the secondary storage system may organize the file system data of the backup snapshot using a tree data structure (e.g., Cohesity Snaptree®).

The tree data structure corresponding to a backup snapshot may be comprised of a file system metadata snapshot tree and one or more file metadata trees. The file system metadata snapshot tree may be used to capture different versions of the primary system's file system data. For example, a first file system metadata snapshot tree may correspond to a first backup snapshot and a second file system metadata snapshot tree may correspond to a second backup snapshot. The tree data structure may allow a chain of file system metadata snapshot trees (i.e., different file system metadata snapshot tree versions) to be linked together by allowing a node of a later version of a file system metadata snapshot tree to reference a node of a previous version of a file system metadata snapshot tree (e.g., a "file system metadata snapshot tree forest"). For example, a node of the second file system metadata snapshot tree corresponding to the second backup snapshot may reference a node of the first file system metadata snapshot tree corresponding to the first backup snapshot.

A file system metadata snapshot tree may include a root node, one or more levels of one or more intermediate nodes associated with the root node, and one or more leaf nodes associated with an intermediate node of the lowest intermediate level. The root node of a file system metadata snapshot tree may include one or more pointers to one or more intermediate nodes. The root node corresponds to a particular backup snapshot of file system data. Each intermediate node includes one or more pointers to other nodes (e.g., a lower intermediate node or a leaf node). A leaf node of the file system metadata snapshot tree may store data associated with a file for a file is smaller than to a limit size (e.g., 256 kB). A leaf node may store an index node (inode). A leaf node of the file system metadata snapshot tree may store a pointer to a file metadata tree for a file with data that is greater than or equal to the limit size.

A file metadata tree may correspond to a version of one of the files included in the backup snapshot. The file metadata tree is a snapshot structure that is configured to store the metadata associated with the file. A file metadata tree may include a root node, one or more levels of one or more intermediate nodes associated with the root node, and one or more leaf nodes associated with an intermediate node of the lowest intermediate level. A file metadata tree is similar to a file system metadata snapshot tree, but a leaf node of a file metadata tree may include a brick identifier associated with one or more data chunks of the file. A data brick may be associated with one or more chunk identifiers (e.g., SHA-1). A chunk metadata table may store information that associates a brick identifier with one or more chunk identifiers and one or more chunk file identifiers. A chunk file metadata table may associate a chunk file identifier with a chunk file storing a plurality of data chunks. The chunk metadata table and the chunk file metadata table may be used, based on a brick identifier, to locate the data chunks associated with the file corresponding to the file metadata tree.

A file system metadata snapshot tree may be associated with a retention time policy, which may indicate that the file system metadata snapshot tree is to be deleted after a threshold period of time (e.g., 30 days). Each node of a file system metadata snapshot tree has an associated reference count. The reference count indicates a number of other nodes that reference a particular node. In the event a retention time policy condition has been satisfied, the root node of a file system metadata snapshot tree and any nodes with a reference count value of "0" of the file system metadata snapshot tree may be removed from memory. In some embodiments, a leaf node of a file system metadata snapshot tree includes a pointer to a file metadata tree and an associated reference count of "0." Deleting the leaf node may cause the file metadata tree to be unreferenced. The unreferenced file metadata tree may include a plurality of leaf nodes with references to data chunks stored by the secondary storage system. As a result, some of the data chunks referenced by the plurality of leaf nodes may not be accessed. Storing inaccessible data chunks is an inefficient use of storage space.

A version of a file may also be associated with a retention time policy, which may cause the file metadata tree corresponding to the version of the file to be deleted after a threshold period of time (e.g., 30 days). The file metadata tree corresponding to the version of the file is deleted at least in part by deleting the root node associated with the file metadata tree. Each node of a file metadata tree has an associated reference count. The reference count indicates a number of other nodes that reference a particular node. In the event a retention time policy condition has been satisfied, the root node of a file metadata tree and any nodes with a reference count value of "0" of the file metadata tree may be removed from memory. Deleting the root node of the file metadata tree corresponding to the version of the file may cause one or more intermediate nodes and one or more leaf nodes to have a reference count of "0." The one or more leaf nodes with a reference count of "0" may store a corresponding brick identifier. A brick identifier may correspond to one or more data chunks associated with the version of the file. Deleting the one or more leaf nodes that have a reference count of "0" may cause the data chunks associated with the version of the file to become unreferenced. As a result, such data chunks may also not be accessed (e.g., read/write access). This is also an inefficient use of storage space.

A secondary storage system may store a large amount of files (e.g., millions) and data chunks associated with the files. The secondary storage system may separately perform a garbage collection process to remove unreferenced data chunks and separately perform a defragmentation process to reclaim unused storage space. Such processes may take a long time to perform because the secondary storage system may dedup data chunks for a plurality of files. For example, a first file metadata tree corresponding to a first file may reference one or more data chunks that are also referenced by a second file metadata tree corresponding to a second file or a second version of the first file. Merely deleting data chunks associated with unreferenced file metadata tree is not a straightforward process because the data chunks associated the unreferenced file metadata tree may be shared with a referenced file metadata tree (e.g., a leaf node of a file system metadata snapshot tree includes a pointer to the file metadata tree corresponding to the second file). Reclaiming unused storage space is also not a straightforward process because combining data from different chunk files into a single file may slow down access times in the event the different chunk files are associated with different files.

A secondary storage system may perform a garbage collection and defragmentation in a single pass to reduce the amount of time needed to perform garbage collection and defragmentation. The data bricks associated with the plurality of file metadata trees may be scanned to determine a number of references associated with a data chunk. The chunk file metadata table may be scanned to determine the data chunks included in a chunk file. One or more file segment data chunks that are not referenced, i.e., unreferenced data chunks, and one or more chunk files that include the one or more unreferenced data chunks may be determined based on scanning the data bricks and the chunk file metadata table. A chunk file that includes one or more unreferenced file segment data chunks may be referred to as a fragmented chunk file.

A chunk file may be scored based on the amount of unreferenced data chunks included in the chunk file. The unreferenced data chunks correspond to storage that may be reclaimed after performing defragmentation. A first fragmented chunk file may be scored higher than a second fragmented chunk file in the event the first fragmented chunk file has more unreferenced data chunks than the second fragmented chunk file. The chunk files may be grouped by file owner (i.e., the file to which a chunk file is associated) and for each group, sorted based on the potential amount of space reclaimed. The referenced chunks of a plurality of fragmented chunk files associated with a group may be combined into a combined chunk file and the fragmented chunk files may be deleted, i.e., a single pass of garbage collection and defragmentation. For example, a first fragmented chunk file having a first set of referenced chunks may be combined with a second fragmented chunk file having a second set of referenced chunks and a third fragmented chunk file having a third set of referenced chunks. The chunk metadata table and the chunk file metadata table may be updated such that data chunks included in the combined chunk file may be located.

By performing garbage collection and defragmentation in a single pass, the amount of time and resources needed to perform such tasks may be reduced. This may allow the secondary storage system to use its resources to perform one or more other tasks, such as backing up data, restoring data, replicating data, migrating data, etc.

FIG. 1 is a block diagram illustrating an embodiment of a storage system for garbage collection and defragmentation. In the example shown, system 100 includes a primary system 102 and a secondary storage system 112.

Primary system 102 is a computing system that stores file system data. The file system data may be stored in storage volume 104. The file system data may be stored across one or more object(s), virtual machine(s), physical entity/entities, file system(s), array backup(s), and/or volume(s) of the primary system 102. The file system data may include one or more files (e.g., content files, text files). Primary system 102 may be comprised of one or more servers, one or more computing devices, one or more storage devices, and/or a combination thereof.

Primary system 102 may include change block tracker 105. The file system data stored on primary system 102 is comprised of one or more data blocks. Change block tracker 105 is configured to monitor the one or more data blocks and store an indication of when one of the one or more data blocks has been modified. Change block tracker 105 may receive one or more data blocks associated with one or more files in route to being stored in one or more object(s), virtual machine(s), physical entity/entities, file system(s), array backup(s), and/or volume(s) of primary system 102. A change block tracker is configured to maintain a map of the one or more changes to the file system data. The map may include the one or more data blocks that were changed, the values associated with the one or more changed data blocks, and an associated timestamp. In the event primary system 102 performs a backup snapshot (either full or incremental), change block tracker 105 is configured to clear (e.g., empty) the map of the one or more data blocks that have been modified.

Backup agent 106 may cause primary system 102 to perform a backup snapshot and to send to secondary storage system 112 file system data stored in storage volume 104. The backup snapshot may be a full backup snapshot or an incremental backup snapshot. Backup agent 106 may receive from secondary storage system 112 a command to perform a backup snapshot. Primary system 102 is coupled to secondary storage system 112 via network connection 110. Connection 110 may be a wired connection or a wireless connection.

Secondary storage system 112 is a storage system configured to ingest and store file system data received from primary system 102 via connection 110. Secondary storage system 112 may be comprised of one or more storage nodes 111, 113, 115 (e.g., storage cluster). Each storage node may have its own corresponding processor. The one or more storage nodes may be one or more solid state drives, one or more hard disk drives, or a combination thereof. The file system data included in a backup snapshot may be stored in one or more of the storage nodes 111, 113, 115. In some embodiments, the one or more storage nodes store one or more copies of the file system data. In one embodiment, secondary storage system 112 is comprised of one solid state drive and three hard disk drives.

Secondary storage system 112 may include file system manager 117. File system manager 117 is configured to organize in a tree data structure the file system data received in a backup snapshot from primary system 102. An example of the tree data structure is a file system metadata snapshot tree (e.g., Cohesity Snaptree®), which may be based on a B+ tree structure (or other type of tree structure in other embodiments). The tree data structure provides a view of the file system data corresponding to a backup snapshot. The view of the file system data corresponding to the backup snapshot may be comprised of a file system metadata snapshot tree and a plurality of file metadata trees. A file metadata tree may correspond to one of the files included in the backup snapshot. The file metadata tree is a snapshot structure that stores the metadata associated with the file. File system manager 117 may be configured to perform one or more modifications, as disclosed herein, to a file system metadata snapshot tree and a file metadata tree. The file system metadata snapshot tree and file metadata trees may be stored in metadata store 114. The metadata store 114 may store the view of file system data corresponding to a backup snapshot. The metadata store may also store data associated with content files that are smaller than a limit size.

The tree data structure may be used to capture different versions of backup snapshots. The tree data structure allows a chain of file system metadata snapshot trees corresponding to different versions of backup snapshots (i.e., different file system metadata snapshot tree versions) to be linked together by allowing a node of a later version of a file system metadata snapshot tree to reference a node of a previous version of a file system metadata snapshot tree (e.g., a "snapshot tree forest"). For example, a root node or an intermediate node of a second file system metadata snapshot tree corresponding to a second backup snapshot may reference an intermediate node or leaf node of a first file system metadata snapshot tree corresponding to a first backup snapshot.

A file system metadata snapshot tree is a representation of a fully hydrated backup because it provides a complete view of the storage volume(s) at a particular moment in time. A fully hydrated backup is a backup that is ready for use without having to reconstruct a plurality of backups to use it. Conventional systems may reconstruct a backup by starting with a full backup and applying one or more changes associated with one or more incremental backups to the data associated with the full backup. In contrast, any file stored in the storage volume at a particular time and the file's contents, for which there is an associated backup, may be determined from the file system metadata snapshot tree, regardless if the associated backup snapshot was a full backup snapshot or an incremental backup snapshot. Creating an incremental backup snapshot may only include copying data of the storage volume(s) that was not previously backed up. However, the file system metadata snapshot tree corresponding to the incremental backup snapshot provides a complete view of the storage volume(s) at the particular moment in time because it includes references to data of the storage volume that was previously stored. For example, a root node associated with the file system metadata snapshot tree may include one or more references to leaf nodes associated with one or more previous backup snapshots and one or more references to leaf nodes associated with the current backup snapshot. This provides significant savings in the amount of time needed to restore or recover a storage volume and/or a database. In contrast, traditional recovery/restoration methods may require significant time, storage, and computational resources to reconstruct a particular version of a volume or database from a full backup and a series of incremental backups.

A file system metadata snapshot tree includes a root node, one or more levels of one or more intermediate nodes associated with the root node, and one or more leaf nodes associated with an intermediate node of the lowest intermediate level. The root node of a file system metadata snapshot tree includes one or more pointers to one or more intermediate nodes. Each intermediate node includes one or more pointers to other nodes (e.g., a lower intermediate node or a leaf node). A leaf node may store file system metadata, data associated with a file that is less than a limit size, an identifier of a data brick, a pointer to a file metadata tree (e.g., Blob structure), or a pointer to a data chunk stored on the secondary storage system.

Data associated with a file that is smaller than or equal to a limit size (e.g., 256 kB) may be stored in a leaf node of the snapshot tree. A leaf node may be an index node (inode). A file metadata tree may be generated for a file that is larger than the limit size. The file metadata tree is a snapshot structure and is configured to store the metadata associated with a version of a file.

The file metadata tree includes a root node, one or more levels of one or more intermediate nodes associated with the root node, and one or more leaf nodes associated with an intermediate node of the lowest intermediate level. The tree data structure associated with a file metadata tree allows a chain of file metadata trees corresponding to different versions of a file to be linked together by allowing a node of a later version of a file metadata tree to reference a node of a previous version of a file metadata tree. For example, a root node or an intermediate node of a second file metadata tree corresponding to a second version of a file may reference an intermediate node or leaf node of a first file metadata tree corresponding to a first version of the file. A file metadata tree may be associated with a plurality of chunk files. A chunk file may be comprised of a plurality of file segment data chunks.

A leaf node of a file metadata tree may include an identifier of a data brick associated with one or more data chunks. For example, a file metadata tree may correspond to a file and a leaf node of the file metadata tree may include a pointer to or an identifier of a data brick associated with one or more data chunks of the file. A data brick may be associated with one or more data chunks. In some embodiments, the size of a brick is 256 kB. The one or more data chunks may be of variable length within a particular range (e.g., 4 kB to 64 kB).

The location of the one or more data chunks associated with a data brick may be identified using one or more data structures (e.g., list, table, etc.) stored in metadata store 114. A first data structure (e.g., chunk metadata table) may store information that associates a brick identifier with one or more chunk identifiers and one or more chunk file identifiers. A second data structure (e.g., chunk file metadata table) may associate a chunk file identifier with a chunk file storing a plurality of data chunks. In some embodiments, the first data structure and the second data structure are combined as a single data structure. The one or more data chunks associated with a data brick may be located based on the chunk metadata table and the chunk file metadata table. For example, a first data brick having a first brick identifier may be associated with a first chunk identifier (e.g., SHA-1). The first chunk identifier may be used in conjunction with the chunk metadata table to identify a chunk file identifier. A chunk file having the identified chunk file identifier is comprised of a plurality of data chunks. The chunk file metadata table may be used to identify a location of the plurality of data chunks. The chunk file metadata table may include offset information of the plurality of data chunks within a chunk file.

File system manager 117 may be configured to delete a file system metadata snapshot tree from metadata store 114 based on one or more retention time policies. An associated file system metadata snapshot tree may have an associated retention time policy associated with it. For example, retention time policy may indicate that a file system metadata snapshot tree is to be deleted after a certain period of time (e.g., day(s), week(s), month(s), year(s), etc.). The one or more retention time policies may reduce the number of file system metadata snapshot trees that secondary storage system 112 is required to maintain and store.

In some embodiments, a retention time policy condition is satisfied (e.g., a file system metadata snapshot tree has been stored in memory and/or storage for more than a threshold period of time) and file system manager 117 determines to remove the file system metadata snapshot tree from memory and/or storage. For example, file system manager 117 may determine that a file system metadata snapshot tree with a particular TreeID is to be stored for the threshold period of time. In the event the threshold period of time has passed, file system manager 117 may be configured to determine that the file system metadata snapshot tree with the particular TreeID is to be removed from memory and/or storage. To remove a file system metadata snapshot tree view from memory, file system manager 117 may traverse the file system metadata snapshot tree along each branch and one or more nodes associated with the file system metadata snapshot tree are removed based on a reference count value associated with a node.

File system manager 117 may be configured to delete a file metadata tree corresponding to a version of a file from metadata store 114 based on one or more retention time policies. A version of a file and its associated file metadata tree may have an associated retention time policy associated with it. For example, retention time policy may indicate that a version of a file and its associated file metadata tree are to be deleted after a certain period of time (e.g., day(s), week(s), month(s), year(s), etc.). The one or more retention time policies may reduce the number of files and associated file metadata trees that secondary storage system 112 is required to maintain and store.

In some embodiments, a retention time policy condition is satisfied (e.g., a version of a file and its associated file metadata tree have been stored in memory for more than a threshold period of time) and file system manager 117 determines to remove the version of the file and its associated file metadata tree from memory and/or storage. For example, file system manager 117 may determine that a file metadata tree with a particular TreeID is to be stored for the threshold period of time. In the event the threshold period of time has passed, file system manager 117 may be configured to determine that the file metadata tree with the particular TreeID is to be removed from memory and/or storage. To remove a file metadata tree view from memory, file system manager 117 may delete a root node of the file metadata tree. Deleting the root node of the file metadata tree corresponding to the version of the file may cause one or more intermediate nodes and one or more leaf nodes to have a reference count of "0." The one or more leaf nodes with a reference count of "0" may store a corresponding brick identifier. A brick identifier may correspond to one or more data chunks associated with the version of the file. Deleting the one or more leaf nodes that have a reference count of "0" may cause the data chunks associated with the version of the file to become unreferenced.

A chunk file may be configured to store a predetermined amount of data (e.g., 8 MB). A chunk file may become fragmented by storing one or more unreferenced data chunks. In some embodiments, the amount of referenced data stored by a chunk file is less than a chunk file threshold (e.g., 4 MB). It may be an inefficient use of storage to store a chunk file that does not store the predetermined amount of data. Data may be more efficiently stored by the secondary storage system by identifying chunk files that store less than the predetermined amount of data and combining a plurality of chunk files into a single chunk file.

File system manager 117 may scan the data bricks associated with the plurality of file metadata trees to determine a number of references associated with a data chunk. File system manager 117 may maintain a map that associates a worker with a corresponding file metadata tree. The plurality of workers may work in parallel to scan their corresponding file metadata tree. Some of the data chunks may be indirectly referenced by one or more file system metadata snapshot trees. Some of the data chunks may not be referenced by any file system metadata snapshot trees. A leaf node of a file metadata tree may store a brick identifier that is associated with one or more data chunks. File system manager 117 may use the chunk metadata table to determine a number of references associated with a data chunk based on a brick identifier and a chunk identifier. For example, an entry of the chunk metadata table may associate a brick identifier with one or more chunk identifiers and one or more corresponding chunk file identifiers. A chunk identifier (e.g., SHA-1) may uniquely identify a data chunk stored by secondary storage system 112. A data chunk and its associated chunk identifier may be referenced (e.g., indirectly by a brick identifier) by a plurality of file metadata trees. File system manager 117 may determine the unreferenced one or more data chunks (e.g., reference count=0) stored by secondary storage system 112.

File system manager 117 may scan the chunk file metadata table to identify the one or more chunk files that include the one or more unreferenced data chunks. For example, the chunk file metadata table may include an entry that associates a chunk file identifier with a chunk identifier, a chunk file offset for a data chunk having the chunk identifier, a storage node storing the data chunk having the chunk identifier, and a file metadata tree associated with the chunk file. Using the list of unreferenced data chunks, file system manager 117 may determine the one or more chunk files that include unreferenced data chunks and corresponding locations of the unreferenced data chunks.

File system manager 117 may score a fragmented chunk file based on an amount of unreferenced data chunks included in the chunk file. The unreferenced data chunks correspond to storage that may be reclaimed after performing defragmentation. The chunk file score may also indicate an amount of space that may be reclaimed from the chunk file. The chunk file score may indicate a percentage of the fragmented chunk file that includes unreferenced data chunks. For example, a fragmented chunk file may have a score of 50. This may indicate that 50% of the chunk file includes unreferenced data chunks. File system manager 117 may group the plurality of fragmented chunk files based on a file metadata tree identifier. A file metadata tree may correspond to a version of content file and the file metadata tree may have an associated identifier. The data chunks of the content file may be stored in a plurality of chunk files. The plurality of fragmented chunk files having the same file metadata tree identifier may be sorted based on the chunk file score. A subset of the fragmented chunk files having the same file metadata tree identifier may be combined into a single chunk file and the fragmented chunk files used to generate the single chunk file are deleted. File system manager 117 may maintain a map that associates a worker with a corresponding file metadata tree. The plurality of workers may work in parallel to combine chunk files associated with their corresponding file metadata trees. The subset of fragmented chunk files may include fragmented chunk files that have a chunk file score above a chunk file score threshold. The combined chunk file may include data chunks that are indirectly referenced by at least one file system metadata snapshot tree. In other embodiments, the combined chunk file includes data chunks that are associated with leaf nodes referenced by at least one other node of a referenced file metadata tree. In some embodiments, a plurality of chunk files are combined into a new chunk file. In other embodiments, one or more referenced data chunks associated with one or more chunk files are merged into an existing chunk file with one or more unreferenced data chunks. The one or more referenced data chunks associated with one or more chunk files may replace the one or more unreferenced data chunks associated with the existing chunk file.

After the combined chunk files are generated, the chunk metadata table and the chunk file metadata table may be updated to reflect the changes. For example, a chunk having a particular chunk identifier may have been previously part of a chunk file that was used to generate a combined chunk file. An entry of the chunk metadata table may be updated to reflect that the chunk identifier is associated with the combined chunk file. A chunk file metadata table may be updated to reflect a location of a chunk having the chunk identifier within the combined chunk file. The plurality of workers may work in parallel to update the chunk metadata table.

Figure 2A:
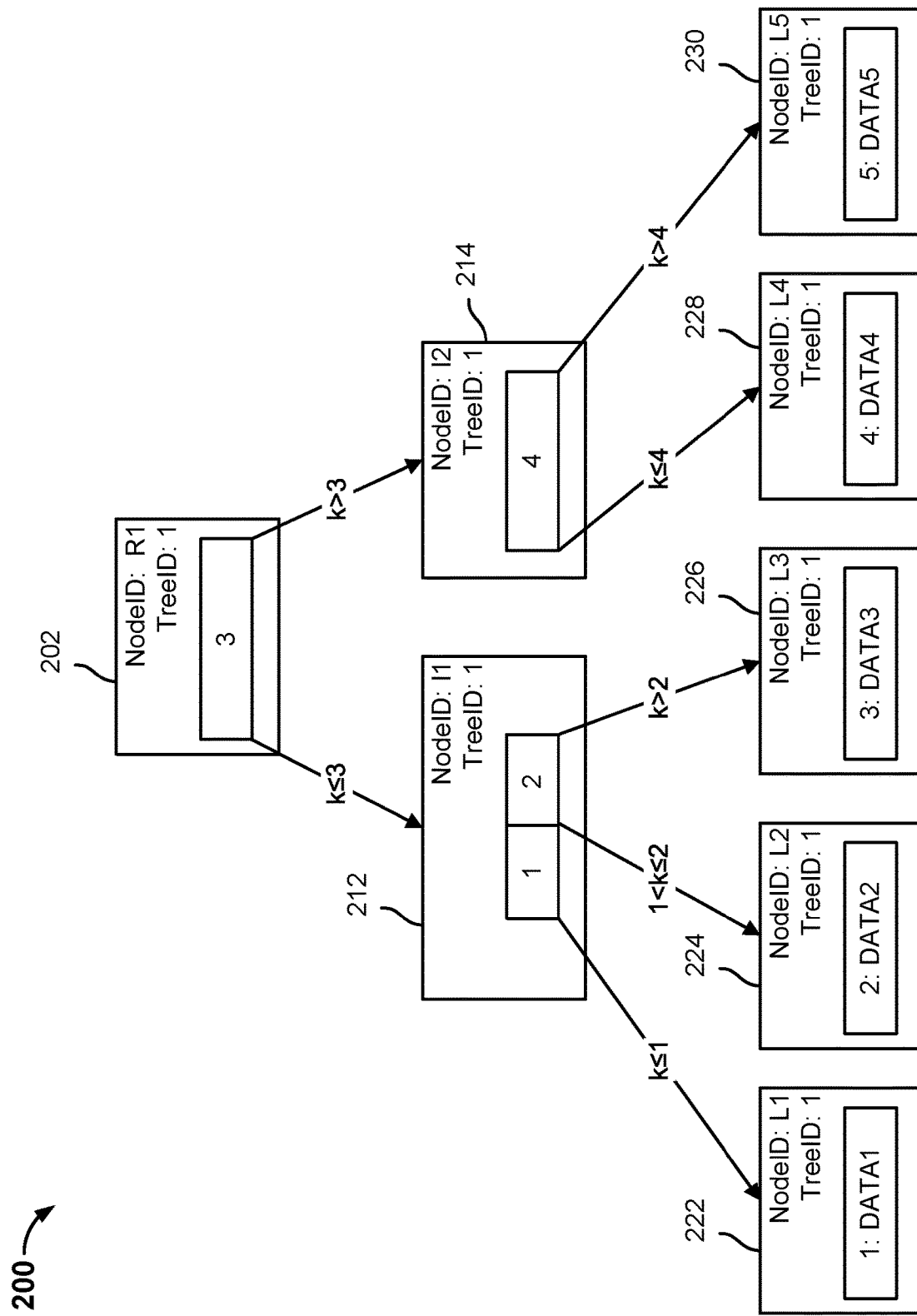
FIG. 2A is a block diagram illustrating an embodiment of a tree data structure.

FIG. 2A is a block diagram illustrating an embodiment of a tree data structure. A tree data structure may be used to represent the file system data that is stored on a secondary storage system, such as secondary storage system 112. The file system data may include metadata for a distributed file system and may include information, such as chunk identifier, chunk offset, file size, directory structure, file permissions, physical storage locations of the files, etc. A file system manager, such as file system manager 117, may generate tree data structure 200.

Tree data structure 200 is comprised of a file system metadata snapshot tree that includes a root node 202, intermediate nodes 212, 214, and leaf nodes 222, 224, 226, 228, and 230. Although tree data structure 200 includes one intermediate level between root node 202 and leaf nodes 222, 224, 226, 228, 230, any number of intermediate levels may be implemented. Tree data structure 200 may correspond to a backup snapshot of file system data at a particular point in time t, for example at time t=1. The backup snapshot may be received at a secondary storage system from a primary system. The file system metadata snapshot tree in conjunction with a plurality of file metadata trees may provide a complete view of the primary system for a particular point in time.

A root node is the starting point of a file system metadata snapshot tree and may include pointers to one or more other nodes. An intermediate node is a node to which another node points (e.g., root node, other intermediate node) and includes one or more pointers to one or more other nodes. A leaf node is a node at the bottom of a file system metadata snapshot tree. Each node of the tree structure includes a view identifier of a view with which the node is associated (e.g., TreeID).

A leaf node may be configured to store key-value pairs of file system data. A data key k is a lookup value by which a particular leaf node may be accessed. For example, "1" is a data key that may be used to lookup "DATA1" of leaf node 222. The data key k may correspond to a brick identifier (e.g., brick number) of a data brick. A data brick may be associated with one or more data chunks. In some embodiments, the leaf node is configured to store file system metadata (e.g., chunk identifier (e.g., hash value, SHA-1, etc.), file size, directory structure, file permissions, physical storage locations of the files, etc.). A leaf node may store a data key k and a pointer to a location that stores the value associated with the data key. In other embodiments, a leaf node is configured to store the actual data when the data associated with a file is less than or equal to a limit size (e.g., 256 kb). In some embodiments, a leaf node includes a pointer to a file metadata tree (e.g., blob structure) when the size of a file is larger than the limit size.

A root node or an intermediate node may include one or more node keys. The node key may be an integer value or a non-integer value. Each node key indicates a division between the branches of the node and indicates how to traverse the tree structure to find a leaf node, i.e., which pointer to follow. For example, root node 202 may include a node key of "3." A data key k of a key-value pair that is less than or equal to the node key is associated with a first branch of the node and a data key k of a key-value pair that is greater than the node key is associated with a second branch of the node. In the above example, to find a leaf node storing a value associated with a data key of "1," "2," or "3," the first branch of root node 202 would be traversed to intermediate node 212 because the data keys of "1," "2", and "3" are less than or equal to the node key "3." To find a leaf node storing a value associated with a data key of "4" or "5," the second branch of root node 202 would be traversed to intermediate node 214 because data keys "4" and "5" are greater than the node key of "3."

A data key k of a key-value pair is not limited to a numerical value. In some embodiments, non-numerical data keys may be used for a data key-value pair (e.g., "name," "age", etc.) and a numerical number may be associated with the non-numerical data key. For example, a data key of "name" may correspond to a numerical key of "3." Data keys that alphabetically come before the word "name" or is the word "name" may be found following a left branch associated with a node. Data keys that alphabetically come after the word "name" may be found by following a right branch associated with the node. In some embodiments, a hash function may be associated with the non-numerical data key. The hash function may determine which branch of a node with which the non-numerical data key is associated.

In the example shown, root node 202 includes a pointer to intermediate node 212 and a pointer to intermediate node 214. Root node 202 includes a NodeID of "R1" and a TreeD of "1." The NodeID identifies the name of the node. The TreeID identifies the view with which the node is associated. When a change is made to data stored in a leaf node as described with respect to FIGS. 2B, 2C, and 2D, the TreeID is used to determine whether a copy of a node is to be made.

Root node 202 includes a node key that divides a set of pointers into two different subsets. Leaf nodes (e.g., "1-3") with a data key k that is less than or equal to the node key are associated with a first branch and leaf nodes (e.g., "4-5") with a data key k that is greater than the node key are associated with a second branch. Leaf nodes with a data key of "1," "2," or "3" may be found by traversing tree data structure 200 from root node 202 to intermediate node 212 because the data keys have a value that is less than or equal to the node key. Leaf nodes with a data key of "4" or "5" may be found by traversing tree data structure 200 from root node 202 to intermediate node 214 because the data keys have a value that is greater than the node key.

Root node 202 includes a first set of pointers. The first set of pointers associated with a data key less than the node key (e.g., "1", "2," or "3") indicates that traversing tree data structure 200 from root node 202 to intermediate node 212 will lead to a leaf node with a data key of "1," "2," or "3." Intermediate node 214 includes a second set of pointers. The second set of pointers associated with a data key greater than the node key indicates that traversing tree data structure 200 from root node 202 to intermediate node 214 will lead to a leaf node with a data key of "4" or "5."

Intermediate node 212 includes a pointer to leaf node 222, a pointer to leaf node 224, and a pointer to leaf node 226. Intermediate node 212 includes a NodeID of "I1" and a TreeID of "1." Intermediate node 212 includes a first node key of "1" and a second node key of "2." The data key k for leaf node 222 is a value that is less than or equal to the first node key. The data key k for leaf node 224 is a value that is greater than the first node key and less than or equal to the second node key. The data key k for leaf node 226 is a value that is greater than the second node key. The pointer to leaf node 222 indicates that traversing tree data structure 200 from intermediate node 212 to leaf node 222 will lead to the node with a data key of "1." The pointer to leaf node 224 indicates that traversing tree data structure 200 from intermediate node 212 to leaf node 224 will lead to the node with a data key of "2." The pointer to leaf node 226 indicates that traversing tree data structure 200 from intermediate node 212 to leaf node 226 will lead to the node with a data key of "3."

Intermediate node 214 includes a pointer to leaf node 228 and a pointer to leaf node 230. Intermediate node 212 includes a NodeID of "I2" and a TreeID of "1." Intermediate node 214 includes a node key of "4." The data key k for leaf node 228 is a value that is less than or equal to the node key. The data key k for leaf node 230 is a value that is greater than the node key. The pointer to leaf node 228 indicates that traversing tree data structure 200 from intermediate node 214 to leaf node 228 will lead to the node with a data key of "4." The pointer to leaf node 230 indicates that traversing tree data structure 200 from intermediate node 214 to leaf node 230 will lead the node with a data key of "5."

Leaf nodes 222, 224, 226, 228, 230 include data key-value pairs of "1: DATA1," "2: DATA2," "3: DATA3," "4: DATA4," "5: DATA5," respectively. Leaf nodes 222, 224, 226, 228, 230 include a NodeID of "L1," "L2," "L3," "L4," "L5," respectively. Each of the leaf nodes 222, 224, 226, 228, 230 include a TreeID of "1." To view the value associated with a data key of "1," tree data structure 200 is traversed from root node 202 to intermediate node 212 to leaf node 222. To view the value associated with a data key of "2," tree data structure 200 is traversed from root node 202 to intermediate node 212 to leaf node 224. To view the value associated with a data key of "3," tree data structure 200 is traversed from root node 202 to intermediate node 212 to leaf node 226. To view the value associated with a data key of "4," tree data structure 200 is traversed from root node 202 to intermediate node 214 to leaf node 228. To view the value associated with a data key of "5," tree data structure 200 is traversed from root node 202 to intermediate node 214 to leaf node 230. In some embodiments, leaf node 222, 224, 226, 228, 230 are configured to store metadata associated with a file. In other embodiments, leaf node 222, 224, 226, 228, 230 are configured to store a pointer to a file metadata tree (e.g., blob structure).

Figure 2B:
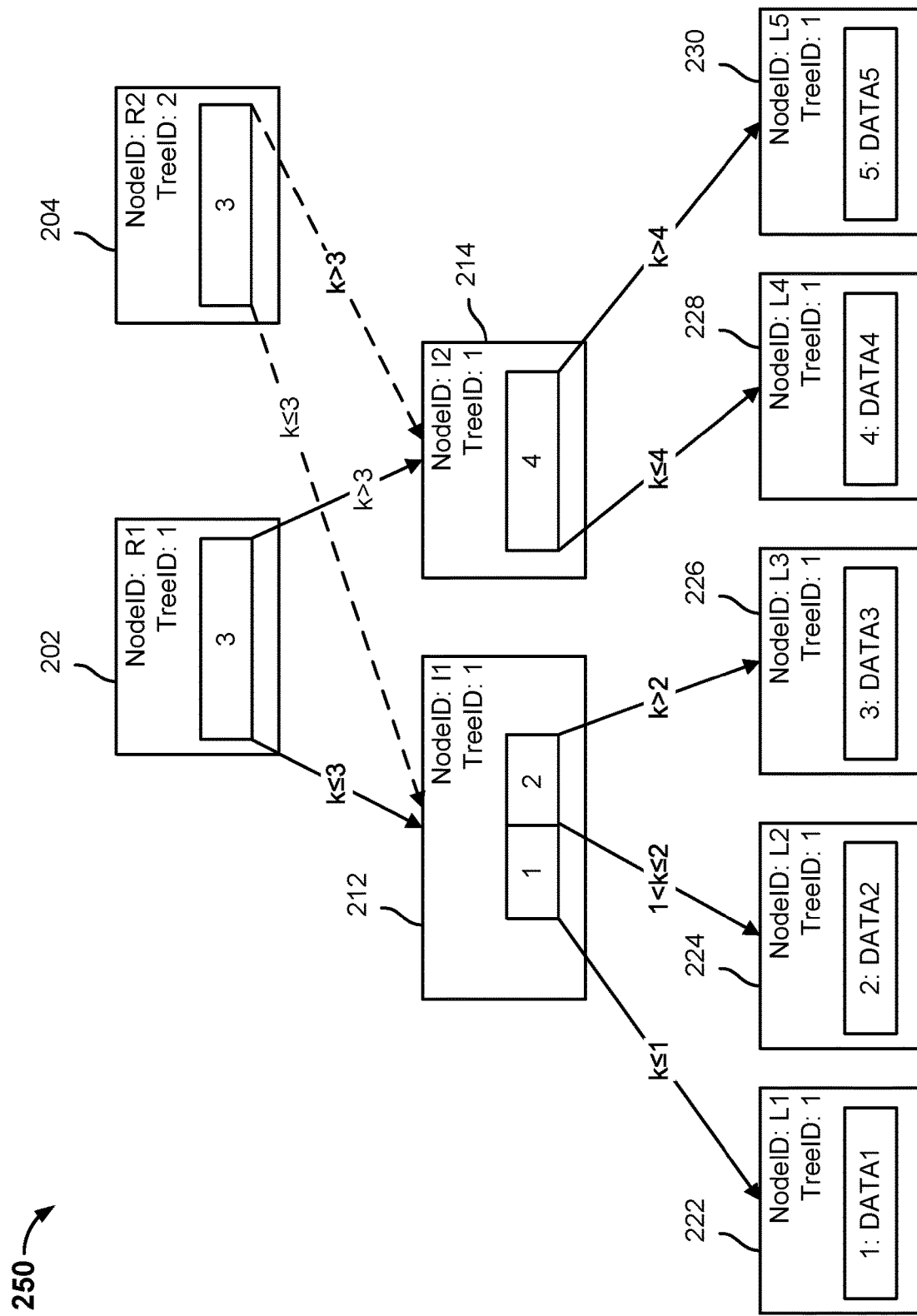
FIG. 2B is a block diagram illustrating an embodiment of a cloned file system metadata snapshot tree.

FIG. 2B is a block diagram illustrating an embodiment of a cloned file system metadata snapshot tree. A file system metadata snapshot tree may be cloned when a file system metadata snapshot tree is added to a tree data structure. In some embodiments, tree data structure 250 may be created by a storage system, such as secondary storage system 112. The file system data of a primary system, such as primary system 102, may be backed up to a secondary storage system, such as secondary storage system 112. A subsequent backup snapshot may correspond to a full backup snapshot or an incremental backup snapshot. The manner in which the file system data corresponding to the subsequent backup snapshot is stored in secondary storage system may be represented by a tree data structure. The tree data structure corresponding to the subsequent backup snapshot is created by cloning a file system metadata snapshot tree associated with a last backup snapshot. The tree data structure associated with a plurality of secondary storage snapshots may be cloned in a similar manner.

In the example shown, tree data structure 250 includes root nodes 202, 204, intermediate nodes 212, 214, and leaf nodes 222, 224, 226, 228, and 230. Tree data structure 250 may be a snapshot of file system data at a particular point in time, such as t=2. The tree data structure can be used to capture different versions of file system data at different moments in time. The tree data structure may allow a chain of backup snapshot versions (i.e., file system metadata snapshot trees) to be linked together by allowing a node of a later version of a file system metadata snapshot tree to reference a node of a previous version of a file system metadata snapshot tree. For example, a file system metadata snapshot tree with root node 204 is linked to a file system metadata snapshot tree with root node 202. Each time a backup snapshot is performed, a new root node may be created and the new root node includes the same set of pointers included in the previous root node, that is the new root node of the file system metadata snapshot tree may be linked to one or more intermediate nodes associated with a previous file system metadata snapshot tree. The new root node also includes a different NodeID and a different TreeID. The TreeID is the view identifier associated with a view of the primary system corresponding to the particular moment in time.

In some embodiments, a root node is associated with a current view of the file system data. A current view may still accept one or more changes to the data. The TreeID of a root node indicates a backup snapshot with which the root node is associated. For example, root node 202 with a TreeID of "1" is associated with a first backup snapshot and root node 204 with a TreeID of "2" is associated with a second backup snapshot. In the example shown, root node 204 is associated with a current view of the file system data.

In other embodiments, a root node is associated with a snapshot view of the file system data. A snapshot view may represent a state of the file system data at a particular moment in time in the past and is not updated. In the example shown, root node 202 is associated with a snapshot view of the file system data.

In the example shown, root node 204 is a clone (e.g., a copy) of root node 202. Similar to root node 202, root node 204 includes the same pointers as root node 202. Root node 204 includes a first set of pointers to intermediate node 212. Root node 204 includes a NodeID of "R2" and a TreeID of "2."

Figure 2C:
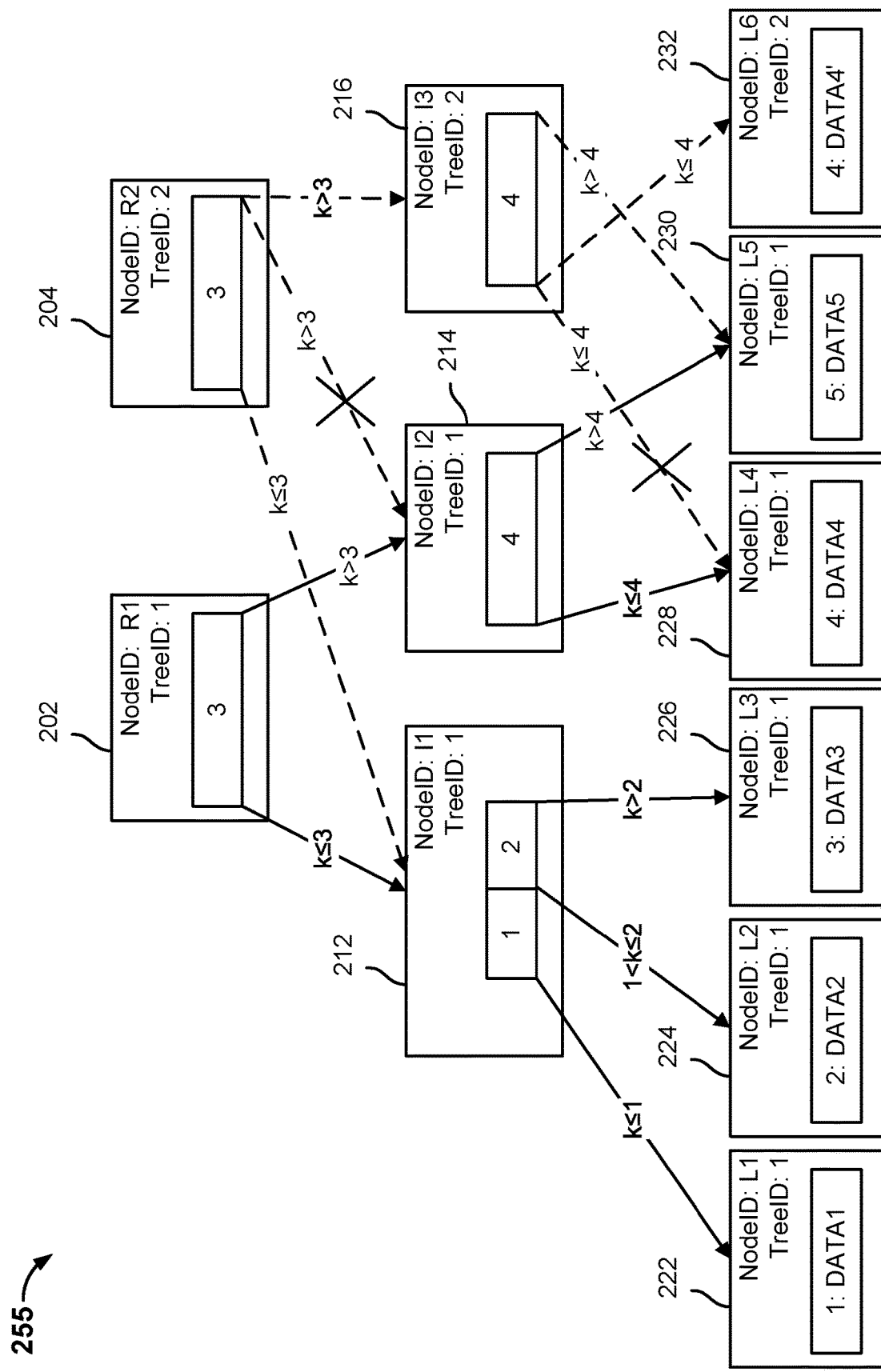
FIG. 2C is a block diagram illustrating an embodiment of modifying a file system metadata snapshot tree.

FIG. 2C is a block diagram illustrating an embodiment of modifying a file system metadata snapshot tree. In the example shown, tree data structure 255 may be modified by a file system manager, such as file system manager 105. A file system metadata snapshot tree with a root node 204 may be a current view of the file system data at time t=2. A current view represents a state of the file system data that is up-to-date and capable of receiving one or more modifications to the snapshot tree that correspond to modifications to the file system data. Because a snapshot represents a perspective of the file system data that is "frozen" in time, one or more copies of one or more nodes affected by a change to file system data, are made.

In the example shown, the value "DATA4" has been modified to be "DATA4'." In some embodiments, the value of a key value pair has been modified. For example, the value of "DATA4" may be a pointer to a file metadata tree corresponding to a first version of a file and the value of "DATA4'" may be a pointer to a file metadata tree corresponding to the second version of the file. In other embodiments, the value of the key pair is the data associated with a content file that is smaller than or equal to a limit size. In other embodiments, the value of the key value pair points to a different file metadata tree. The different file metadata tree may be a modified version of the file metadata tree that the leaf node previously pointed.

To modify a file system metadata snapshot tree, the file system manager may start at root node 204 because that is the root node associated with the file system metadata snapshot tree at time t=2 (i.e., the root node associated with the last backup snapshot). The value "DATA4" is associated with the data key "4." The file system manager may traverse tree data structure 255 from root node 204 until it reaches a target node, in this example, leaf node 228. The file system manager may compare the TreeID at each intermediate node and leaf node with the TreeID of the root node. In the event the TreeID of a node matches the TreeID of the root node, the file system manager may proceeds to the next node. In the event the TreeID of a node does not match the TreeID of the root node, a shadow copy of the node with the non-matching TreeID may be made. For example, to reach a leaf node with a data key of "4," the file system manager begins at root node 204 and proceeds to intermediate node 214. The file system manager compares the TreeID of intermediate node 214 with the TreeID of root node 204, determines that the TreeID of intermediate node 214 does not match the TreeID of root node 204, and creates a copy of intermediate node 214. The intermediate node copy 216 includes the same set of pointers as intermediate node 214, but includes a TreeID of "2" to match the TreeID of root node 204. The file system manager may update a pointer of root node 204 to point to intermediate node 216 instead of pointing to intermediate node 214. The file system manager may traverse tree data structure 255 from intermediate node 216 to leaf node 228, determine that the TreeID of leaf node 228 does not match the TreeID of root node 204, and create a copy of leaf node 228. Leaf node copy 232 stores the modified value "DATA4'" and includes the same TreeID as root node 204. The file system manager may update a pointer of intermediate node 216 to point to leaf node 232 instead of pointing to leaf node 228.

In some embodiments, leaf node 232 stores the value of a key value pair that has been modified. In other embodiments, leaf node 232 stores the modified data associated with a file that is smaller than or equal to a limit size. In other embodiments, leaf node 232 stores a pointer to a file metadata tree corresponding to a file, such as a virtual machine container file.

Figure 2D:
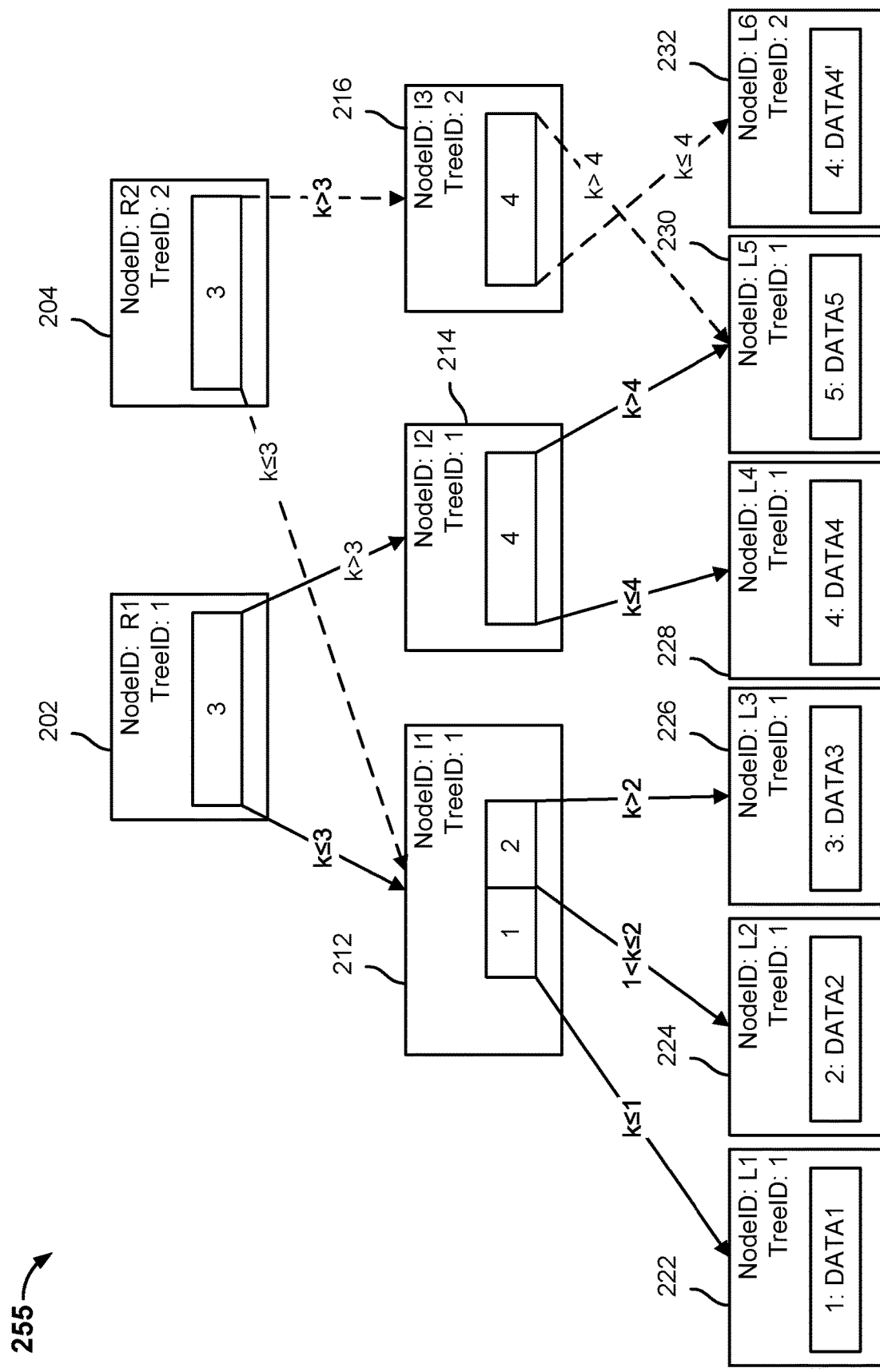
FIG. 2D is a block diagram illustrating an embodiment of a modified snapshot tree.

FIG. 2D is a block diagram illustrating an embodiment of a modified snapshot tree. Tree data structure 255 shown in FIG. 2D illustrates a result of the modifications made to a snapshot tree as described with respect to FIG. 2C.

Figure 2E:
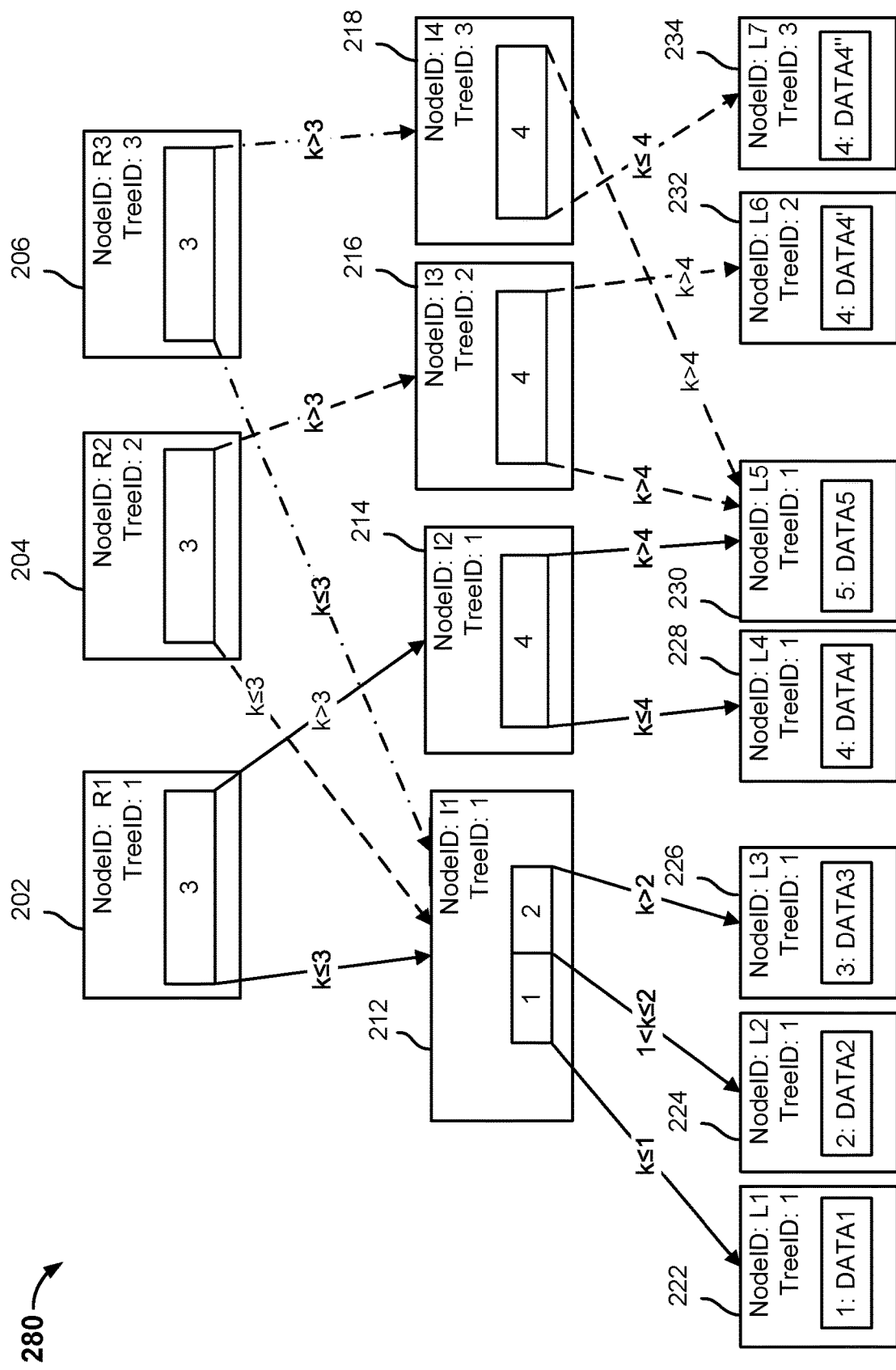
FIG. 2E is a block diagram illustrating an embodiment of a tree data structure at a particular moment in time.

FIG. 2E is a block diagram illustrating an embodiment of a tree data structure at a particular moment in time. In the example shown, tree data structure 280 includes a file system metadata snapshot tree at time t=3. In the example shown, tree data structure 280 includes a file system metadata snapshot tree comprising root node 206, intermediate nodes 212, 218, and leaf nodes 222, 224, 226, 230, 234. Root node 202 is associated with a first backup snapshot, root node 204 is associated with a second backup snapshot, and root node 206 is associated with a third backup snapshot. The snapshot tree having root node 206 is a modified version of the snapshot tree having root node 204 (i.e., the value of "DATA4'" has been modified to be "DATA4''").

Figure 3A:
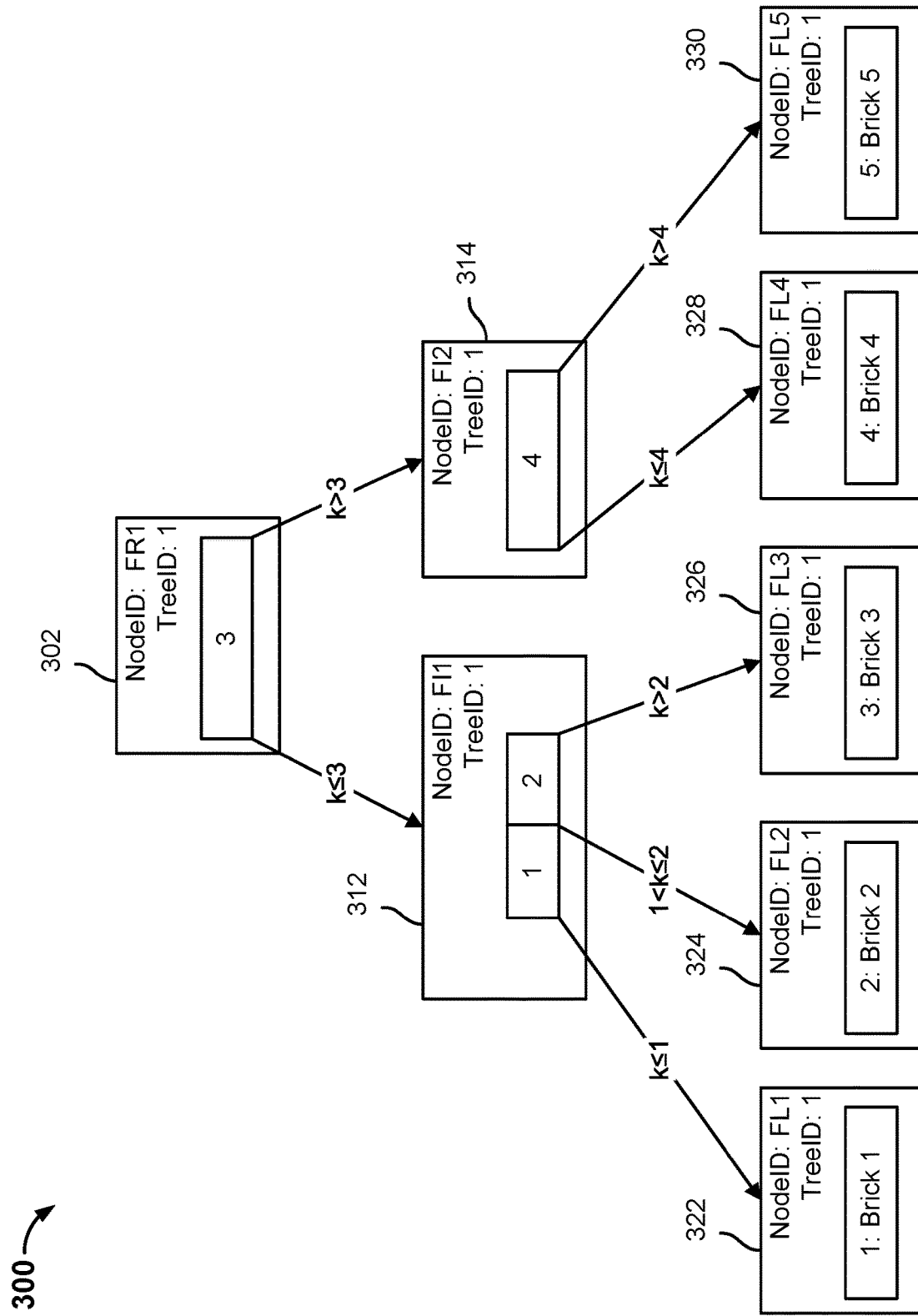
FIG. 3A is a block diagram illustrating an embodiment of a tree data structure.

FIG. 3A is a block diagram illustrating an embodiment of a tree data structure. In some embodiments, tree data structure 300 may be created by a storage system, such as secondary storage system 104. In the example shown, tree data structure 300 corresponds to a file and stores the metadata associated with the file. For example, tree data structure 300 may correspond to a virtual machine container file and may be used to store virtual machine file system metadata. A leaf node of a file system metadata snapshot tree, such as a leaf node of tree data structures 200, 250, 255, may include a pointer to a tree data structure corresponding to a file, such as tree data structure 300. Tree data structure 300 may be referred to as a "metadata structure" or a "snapshot structure."

A tree data structure corresponding to a content file (e.g. virtual machine container file) at a particular point in time (e.g., a particular version) may be comprised of a root node, one or more levels of one or more intermediate nodes, and one or more leaf nodes. In some embodiments, a tree data structure corresponding to a content file is comprised of a root node and one or more leaf nodes without any intermediate nodes. Tree data structure 300 may be a snapshot of a content file at a particular point in time t, for example at time t=1.

In the example shown, tree data structure 300 includes a file root node 302, file intermediate nodes 312, 314, and file leaf nodes 322, 324, 326, 328, 330. Although tree data structure 300 includes one intermediate level between root node 302 and leaf nodes 322, 324, 326, 328, 330, any number of intermediate levels may be implemented. Similar of the file system metadata snapshot trees described above, each node includes a "NodeID" that identifies the node and a "TreeID" that identifies a snapshot/view with which the node is associated.

In the example shown, root node 302 includes a pointer to intermediate node 312 and a pointer to intermediate node 314. Root node 202 includes a NodeID of "FR1" and a TreeID of "1."

In the example shown, intermediate node 312 includes a pointer to leaf node 322, a pointer to leaf node 324, and a pointer to leaf node 326. Intermediate node 312 includes a NodeID of "FI1" and a TreeID of "1." Intermediate node 312 includes a first node key and a second node key. The data key k for leaf node 322 is a value that is less than or equal to the first node key. The data key for leaf node 324 is a value that is greater than the first node key and less than or equal to the second node key. The data key for leaf node 326 is a value that is greater than the second node key. The pointer to leaf node 322 indicates that traversing tree data structure 300 from intermediate node 312 to leaf node 322 will lead to the node with a data key of "1." The pointer to leaf node 324 indicates that traversing tree data structure 300 from intermediate node 312 to leaf node 324 will lead to the node with a data key of "2." The pointer to leaf node 326 indicates that traversing tree data structure 300 from intermediate node 312 to leaf node 326 will lead to the node with a data key of "3."

In the example shown, intermediate node 314 includes a pointer to leaf node 328 and a pointer to leaf node 330. Intermediate node 314 includes a NodeID of "FI2" and a TreeID of "1." Intermediate node 314 includes a node key. The data key k for leaf node 328 is a value that is less than or equal to the node key. The data key for leaf node 330 is a value that is greater than the node key. The pointer to leaf node 328 indicates that traversing tree data structure 300 from intermediate node 314 to leaf node 328 will lead to the node with a data key of "4." The pointer to leaf node 330 indicates that traversing tree data structure 300 from intermediate node 314 to leaf node 330 will lead the node with a data key of "5."

Leaf node 322 includes a data key-value pair of "1:Brick 1." "Brick 1" is a brick identifier that identifies the data brick associated with one or more data chunks of a content file (e.g., virtual machine container file) corresponding to tree data structure 300. Leaf node 322 includes NodeID of "FL1" and a TreeID of "1." To view the value associated with a data key of "1," tree data structure 300 is traversed from root node 302 to intermediate node 312 to leaf node 322.

Leaf node 324 includes a data key-value pair of "2: Brick 2." "Brick 2" may be associated with one or more data chunks associated with a content file. Leaf node 324 includes NodeID of "FL2" and a TreeID of "1." To view the value associated with a data key of "2," tree data structure 300 is traversed from root node 302 to intermediate node 312 to leaf node 324.

Leaf node 326 includes a data key-value pair of "3: Brick 3." "Brick 3" may be associated with one or more data chunks associated with a content file. Leaf node 326 includes NodeID of "FL3" and a TreeID of "1." To view the value associated with a data key of "3," tree data structure 300 is traversed from root node 302 to intermediate node 312 to leaf node 326.

Leaf node 328 includes a data key-value pair of "4: Brick 4." "Brick 4" may be associated with one or more data chunks associated with a content file. Leaf node 328 includes NodeID of "FL4" and a TreeID of "1." To view the value associated with a data key of "4," tree data structure 300 is traversed from root node 302 to intermediate node 314 to leaf node 328.

Leaf node 330 includes a data key-value pair of "5: Brick 5." "Brick 5" may be associated with one or more data chunks associated with a content file. Leaf node 330 includes NodeID of "FL5" and a TreeID of "1." To view the value associated with a data key of "5," tree data structure 300 is traversed from root node 302 to intermediate node 314 to leaf node 330.

A content file, such as a virtual machine container file, may be comprised of a plurality of data chunks and one or more chunk files. A data brick may be associated with one or more chunk identifiers (e.g., SHA-1). In the example shown, leaf nodes 322, 324, 326, 328, 330 each store a corresponding brick identifier. A chunk metadata table may store information that associates a brick identifier with one or more chunk identifiers and one or more chunk file identifiers corresponding to the one or more chunk identifiers. A chunk file metadata table may associate a chunk file identifier with a chunk file storing a plurality of data chunks. The chunk metadata table and the chunk file metadata table may be used, based on a brick identifier, to locate the data chunks associated with the file corresponding to the file metadata tree.

Figure 3B:
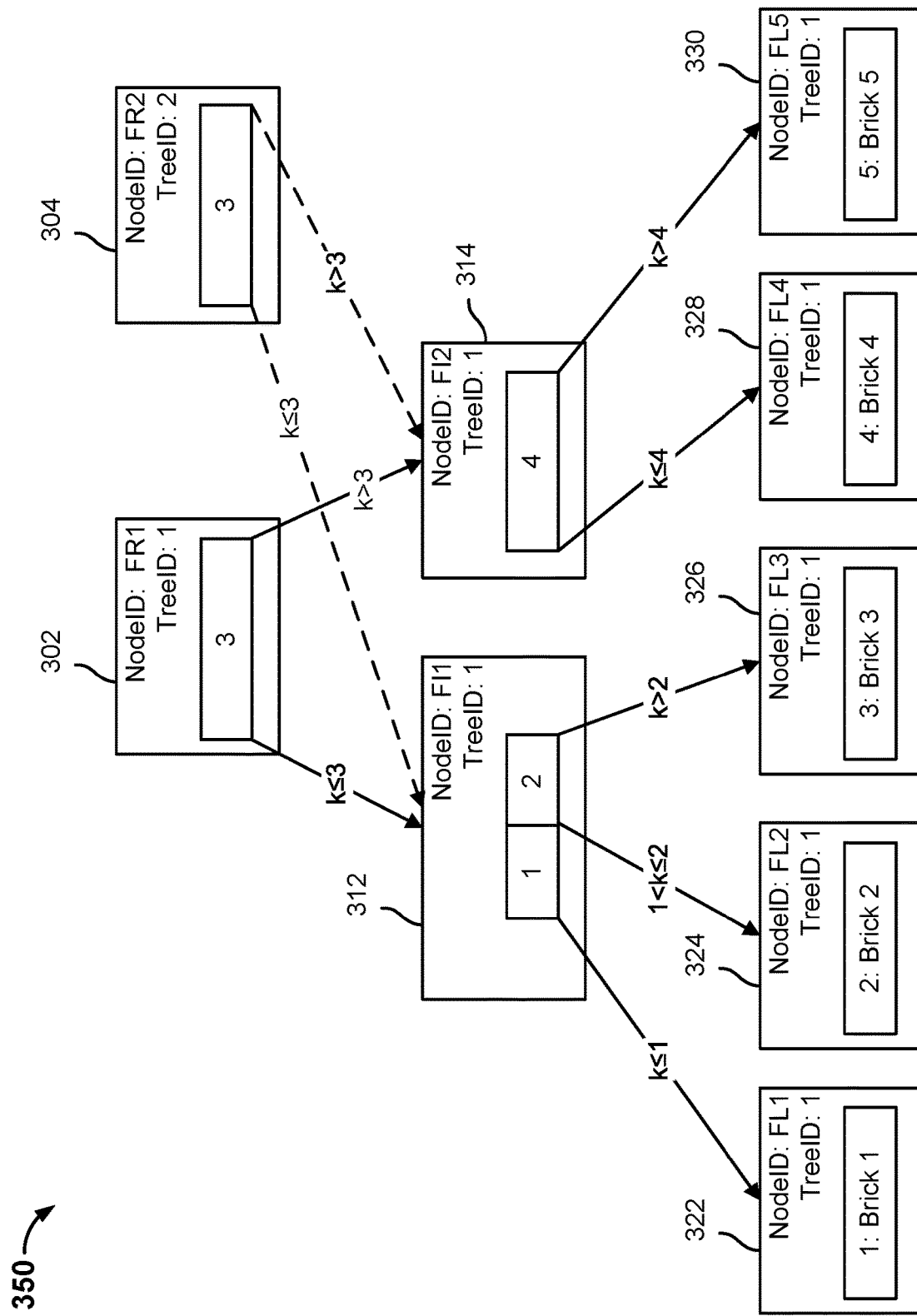
FIG. 3B is a block diagram illustrating an embodiment of adding a file metadata tree to a tree data structure.

FIG. 3B is a block diagram illustrating an embodiment of adding a file metadata tree to a tree data structure. In some embodiments, tree data structure 350 may be created by a storage system, such as secondary storage system 104. The tree data structure corresponding to a file can be used to capture different versions of the file at different moments in time. When a backup snapshot or secondary storage snapshot is received, a root node of the file metadata tree may be linked to one or more intermediate nodes associated with a previous file metadata tree. This may occur when the file is included in both backup/secondary storage snapshots.

In the example shown, tree data structure 350 includes a first file metadata tree comprising root node 302, intermediate nodes 312, 314, and leaf nodes 322, 324, 326, 328, and 330 and a second file metadata tree comprised of root node 304, intermediate nodes 312, 314, and leaf nodes 322, 324, 326, 328, and 330. The second file metadata tree may correspond to a version of a file at a particular point in time, for example at time t=2. The first file metadata tree may correspond to a first version of a virtual machine container file and the second file metadata tree may correspond to a second version of the virtual machine container file.

To create a snapshot of the file data at time t=2, a new root node is created. The new root node may be clone of the original node and include the same set of pointers as the original node, but includes a different NodeID and a different TreeID. In the example shown, root node 304 includes a set of pointers to intermediate nodes 312, 314, which are intermediate nodes associated with a previous snapshot. In the example shown, root node 304 is a copy of root node 302. Similar to root node 302, root node 304 includes the same pointers as root node 302. Root node 304 includes a NodeID of "FR2" and a TreeID of "2."

Figure 3C:
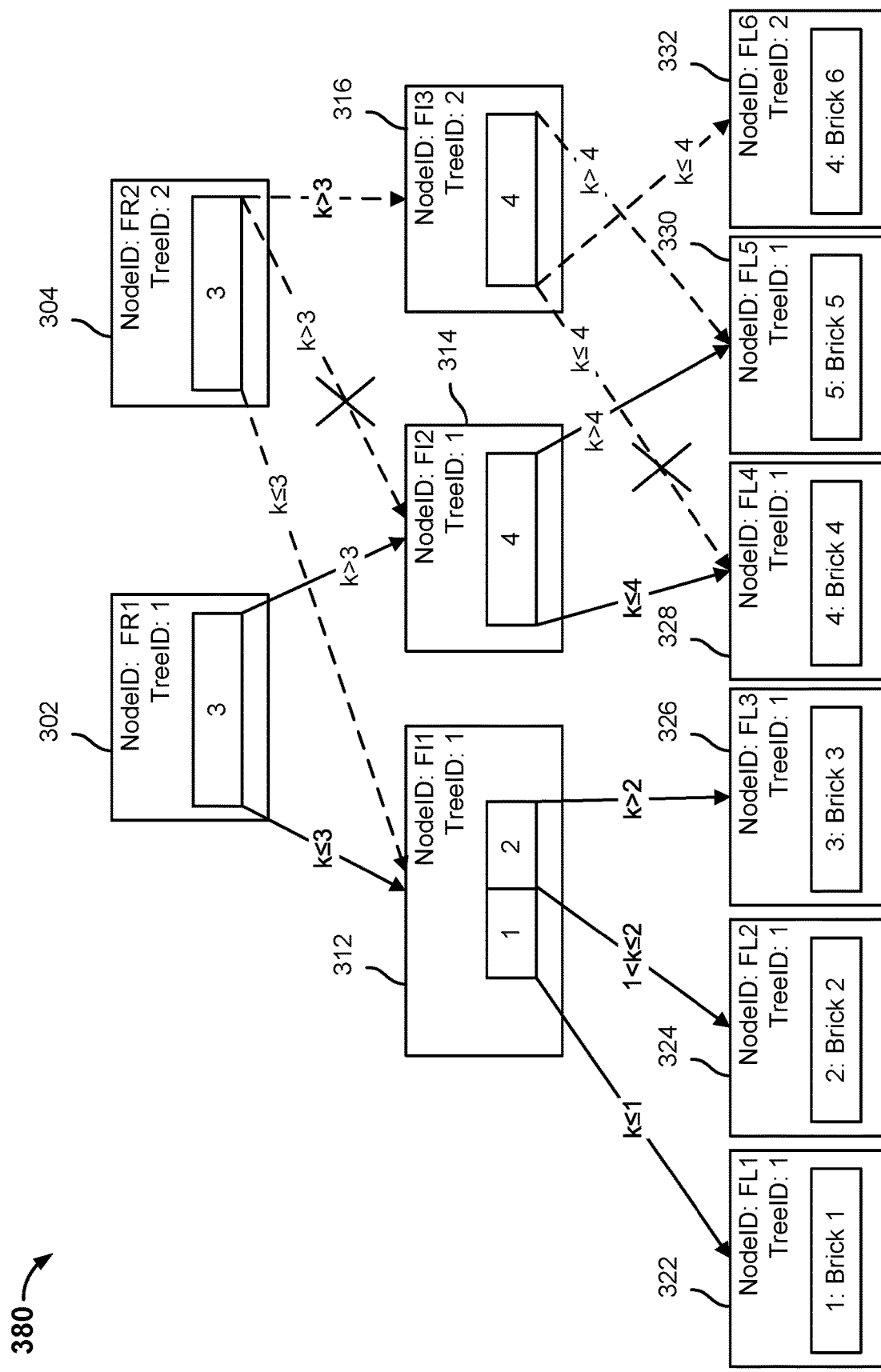
FIG. 3C is a block diagram illustrating an embodiment of modifying a file metadata tree.

FIG. 3C is a block diagram illustrating an embodiment of modifying a file metadata tree. In the example shown, tree data structure 380 may be modified by a file system manager, such as file system manager 105. A file metadata tree with root node 304 may be a current view of the file data at time, for example, at time t=2.

In some embodiments, the file data of a content file may be modified such that one of the data chunks is replaced by another data chunk. When a data chunk of file data associated with a previous backup snapshot is replaced with a new data chunk, the data brick associated with the new data chunk may be different. A leaf node of a file metadata tree may be configured to store a brick identifier of a brick associated with the new data chunk. To represent this modification to the file data, a corresponding modification is made to a current view of a file metadata tree. The data chunk of the file data that was replaced has a corresponding leaf node in the previous file metadata tree. A new leaf node that corresponds to the new data chunk may be created, as described herein, in the current view of the file metadata tree. The new leaf node may include an identifier associated with the current view. The new leaf node may also store the chunk identifier associated with the modified data chunk.

In the example shown, a data chunk associated with "Brick 4" has been modified. The data chunk associated with "Brick 4" has been replaced with a data chunk associated with "Brick 6." At t=2, the file system manager starts at root node 304 because that is the root node associated with the file metadata tree at time t=2. The value "Brick 4" is associated with the data key "4." The file system manager may traversess tree data structure 380 from root node 304 until it reaches a target node, in this example, leaf node 328. The file system manager may compare the TreeID at each intermediate node and leaf node with the TreeID of the root node. In the event the TreeID of a node matches the TreeID of the root node, the file system manager may proceed to the next node. In the event the TreeID of a node does not match the TreeID of the root node, a shadow copy of the node with the non-matching TreeID may be made. For example, to reach a leaf node with a data key of "4," the file system manager may begin at root node 304 and proceed to intermediate node 314. The file system manager may compare the TreeID of intermediate node 314 with the TreeID of root node 304, determine that the TreeID of intermediate node 314 does not match the TreeID of root node 304, and create a copy of intermediate node 314. The intermediate node copy 316 may include the same set of pointers as intermediate node 314, but include a TreeID of "2" to match the TreeID of root node 304. The file system manager may update a pointer of root node 304 to point to intermediate node 316 instead of pointing to intermediate node 314. The file system manager may traverse tree data structure 380 from intermediate node 316 to leaf node 328, determine that the TreeID of leaf node 328 does not match the TreeID of root node 304, and create a copy of leaf node 328. Leaf node 332 is a copy of leaf node 328, but stores the brick identifier "Brick 6" and includes the same TreeID as root node 304. The file system manager updates a pointer of intermediate node 316 to point to leaf node 332 instead of pointing to leaf node 328.

Figure 3D:
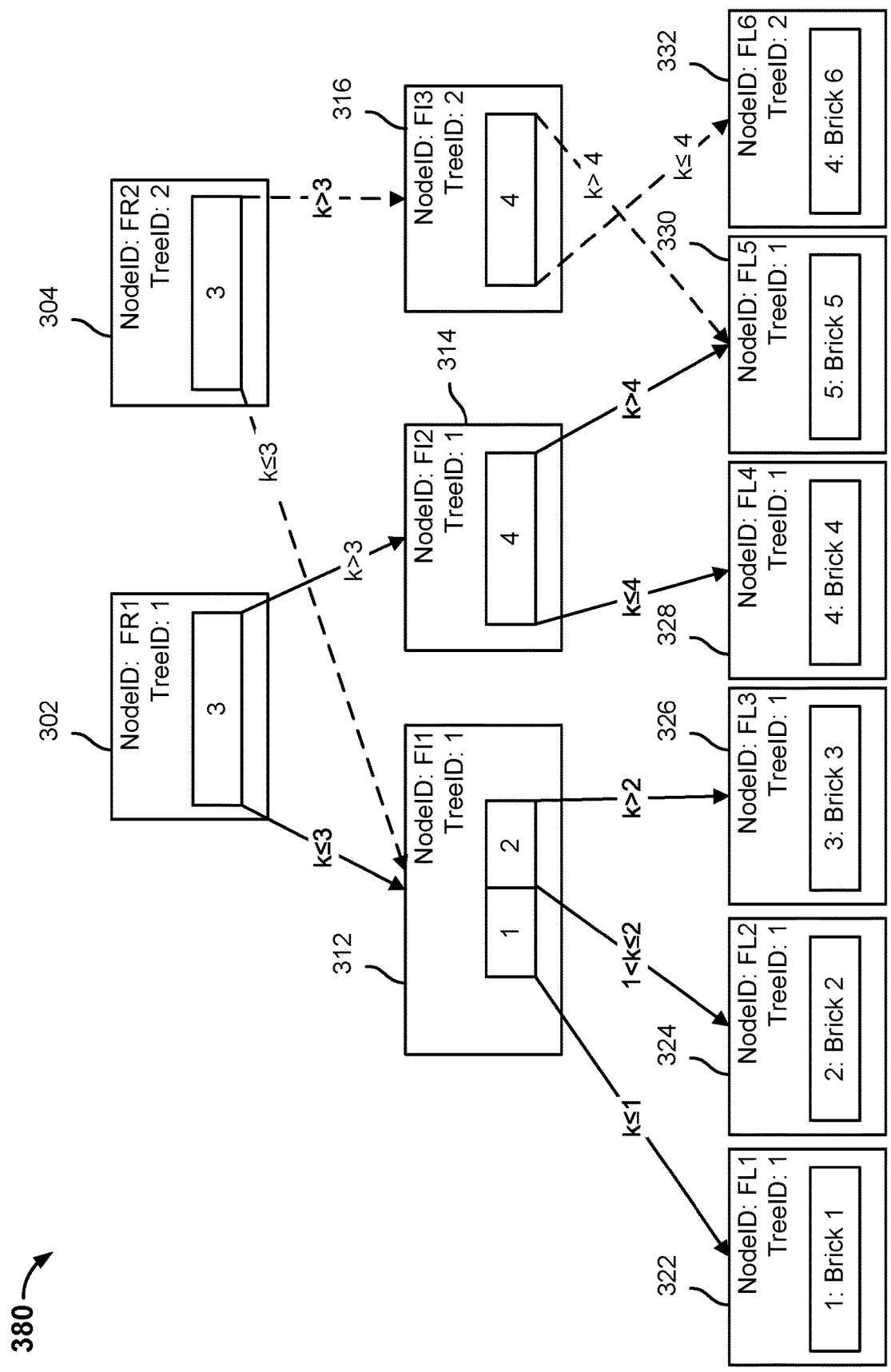
FIG. 3D is a block diagram illustrating an embodiment of a modified file metadata tree.

FIG. 3D is a block diagram illustrating an embodiment of a modified file metadata tree. The file metadata tree 380 shown in FIG. 3D illustrates a result of the modifications made to file metadata tree 380 as described with respect to FIG. 3C.

FIG. 4A is a diagram illustrating an embodiment of a chunk metadata table. Chunk metadata table 400 may be stored in a metadata store, such as metadata store 114. In the example shown, chunk metadata table 400 is configured to associate a brick identifier with a chunk identifier and a chunk file identifier. A leaf node of a file metadata tree may store a brick identifier. Chunk metadata table 400 may be used to determine one or more data chunks associated with a brick identifier and a location of the one or more data chunks.

In the example shown, "Brick 1" is associated with a data chunk having a chunk identifier of "SHA-1a" and a location of the data chunk may be found in a chunk file having a chunk file identifier of "Chunk File 1." "Brick 2" is associated with a data chunk having a chunk identifier of "SHA-1b" and a location of the data chunk may be found in a chunk file having a chunk file identifier of "Chunk File 2." "Brick n" is associated with a data chunk having a chunk identifier of "SHA-1a" and a location of the data chunk may be found in a chunk file having a chunk file identifier of "Chunk File n."

A data brick may be associated with a plurality of data chunks having different chunk identifiers. In some embodiments, the plurality of different chunk identifiers are associated with a chunk file having the same chunk file identifier. In other embodiments, the plurality of different chunk identifiers are associated with chunk files having different chunk identifiers.

In some embodiments, different brick identifiers may be associated with a data chunk having the same chunk identifier. For example, a first file metadata tree may include a leaf node that stores the value of a first brick identifier. The first brick identifier may be associated with a first chunk identifier. A second file metadata tree may include a leaf node that stores the value of a second brick identifier. The second brick identifier may also be associated with the first chunk identifier. In the event a chunk identifier is associated with a plurality of brick identifiers, the data chunk associated with the chunk identifier is de-duplicated for a first file corresponding to the first file metadata tree and a second file corresponding to the second file metadata tree.

FIG. 4B is a diagram illustrating an embodiment of a chunk file metadata table. Chunk file metadata table 450 may be stored in a metadata store, such as metadata store 114. In the example shown, chunk file metadata table 450 is configured to associate a chunk file identifier with a chunk identifier, a chunk file offset, a storage node, and a primary owner.

A chunk file is comprised of a plurality of file segment data chunks. Chunk file metadata table 450 may indicate the plurality of data chunks associated with a chunk file. Chunk file metadata table 450 may also indicate corresponding locations of the data chunks within the chunk file. For example, chunk file metadata table 450 indicates that a chunk file having a chunk file identifier of "Chunk File 1" is comprised of at least a first data chunk having a chunk identifier of "SHA-1a" and a second data chunk having a chunk identifier of "SHA-1b." The first data chunk has a chunk file offset of "0-256 kb" and the second data chunk has a chunk file offset of "256 kb-512 kb." In some embodiments, a data chunk included in a chunk file is associated with a file metadata tree that is referenced by a file system metadata snapshot tree. In other embodiments, a data chunk included in a chunk file is associated with a file metadata tree that is not referenced by a file system metadata snapshot tree.

A secondary storage system comprised of a plurality of nodes may store duplicate copies of a chunk file across the nodes. This may ensure access to the chunk file in the event a node of the secondary storage system goes offline. In the example shown, a chunk file having a chunk file identifier of "Chunk File 1" is stored on storage node 1 and storage node 3, a chunk file having a chunk file identifier of "Chunk File 2" is stored on storage node 2 and storage node 4, and a chunk file having a chunk file identifier of "Chunk File n" is stored on storage node 1 and storage node 3.

A chunk file may be associated with a primary owner. The primary owner may correspond to the original file metadata tree that includes references to the data chunks include in the chunk file. For example, a primary system may perform a first backup snapshot that includes a first content file and send the data associated with the first content file to a secondary storage system. The secondary storage system may generate and store the data associated with the first content file in one or more chunk files. The secondary storage system may generate a first file metadata tree corresponding to the first content file. In other embodiments, the primary owner corresponds to the original content file that is associated with the chunk file.

In contrast, the primary system may perform a second backup snapshot that includes a second content file and send the data associated with the second content file to the secondary storage system. Some of the data associated with the second content file may already be stored on the secondary storage system. Instead of generating a second chunk file for the duplicate data, the secondary storage system may generate a second file metadata tree corresponding to the second content file and the second file metadata tree may include one or more references to the one or more chunk files associated with the first content file. The second file metadata tree may be considered to be a secondary owner. In the example shown, the file metadata tree corresponding to "File 1" is the primary owner of chunk file 1 and the file metadata tree corresponding to "File n" is the primary owner of chunk file n. Chunk file metadata table may associate chunk files with one or more secondary owners.

Figure 5A:
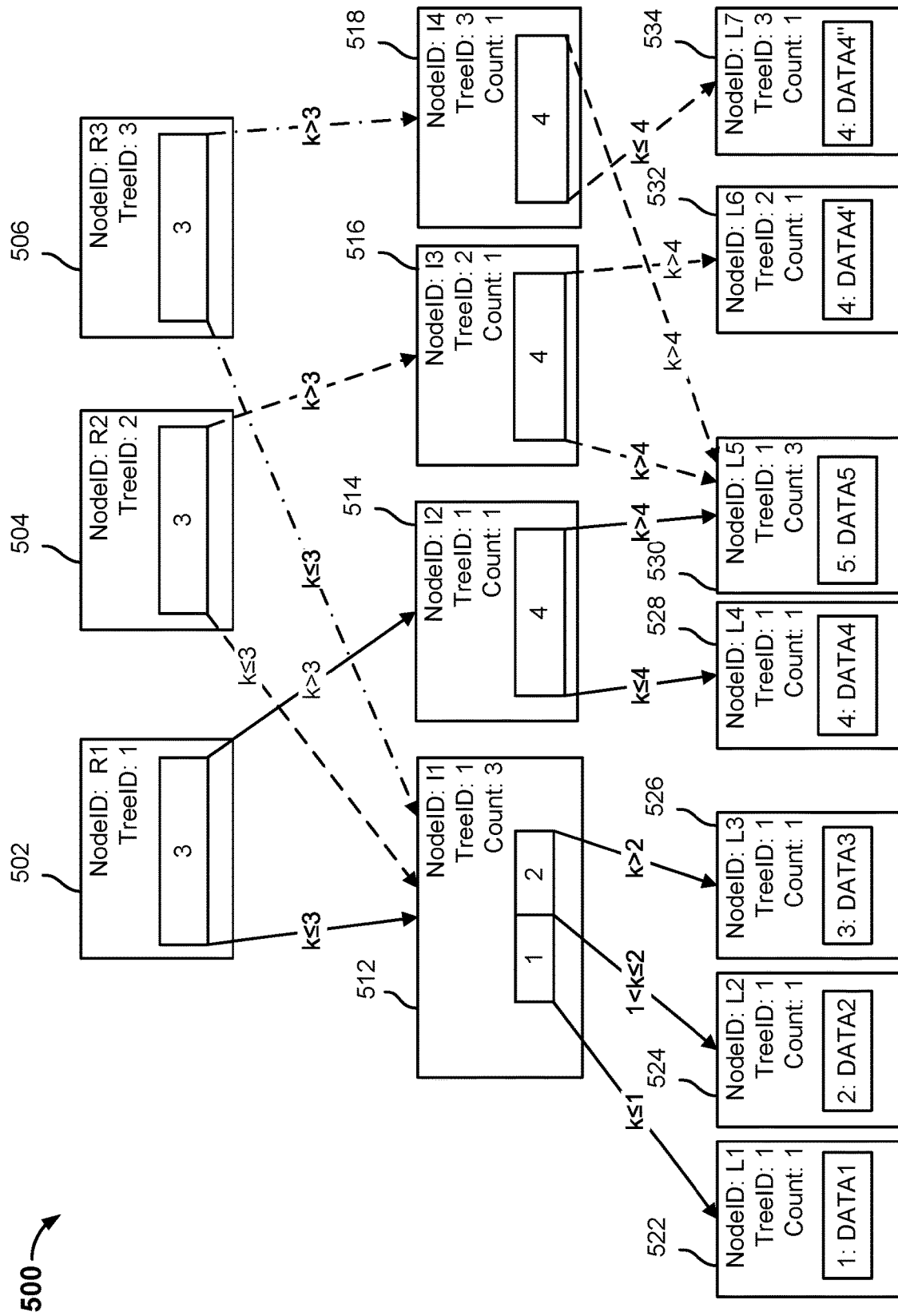
FIGS. 5A, 5B, 5C are block diagrams illustrating an embodiment of maintaining file system metadata snapshot trees.
Figure 5B:
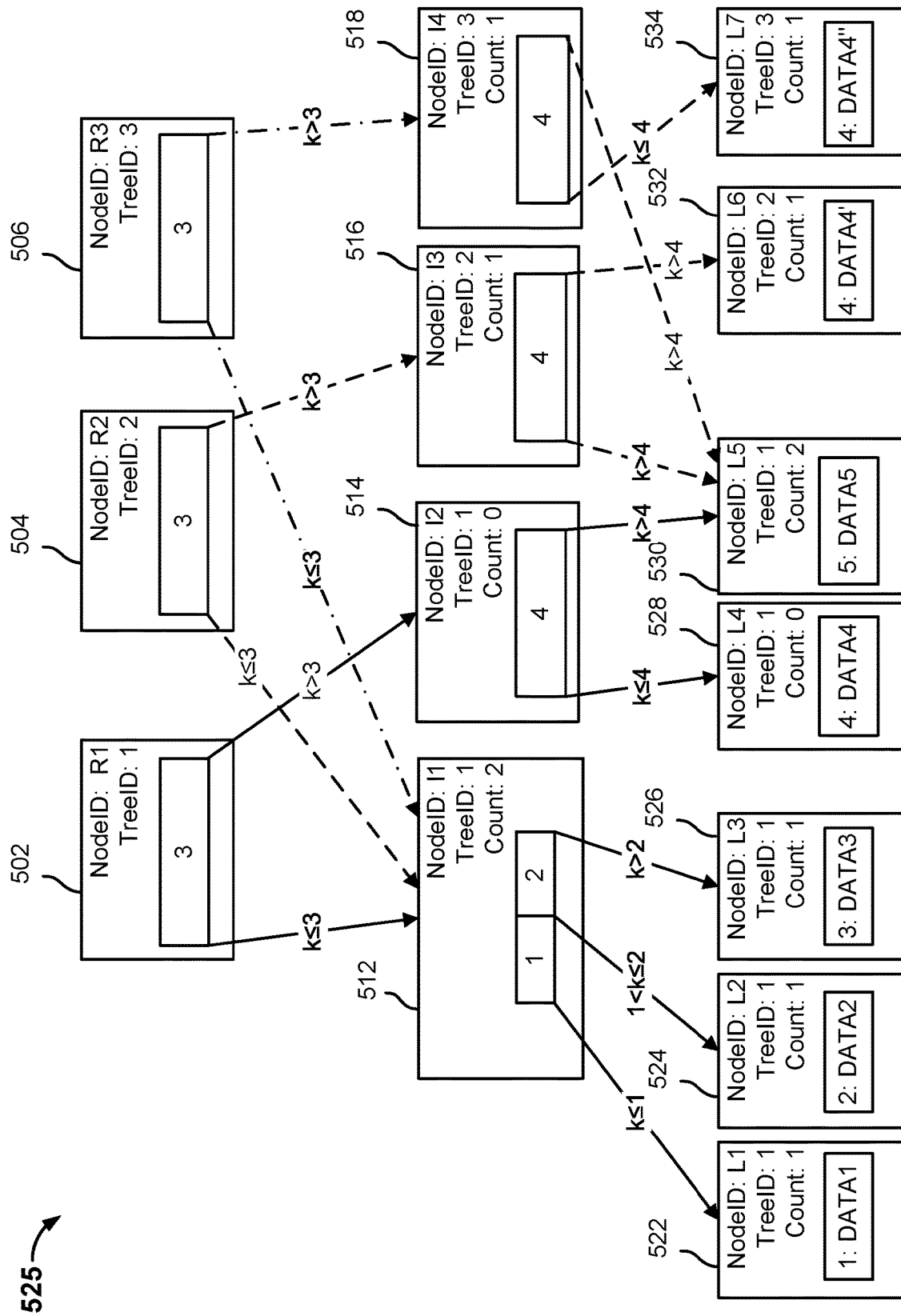
Figure 5C:
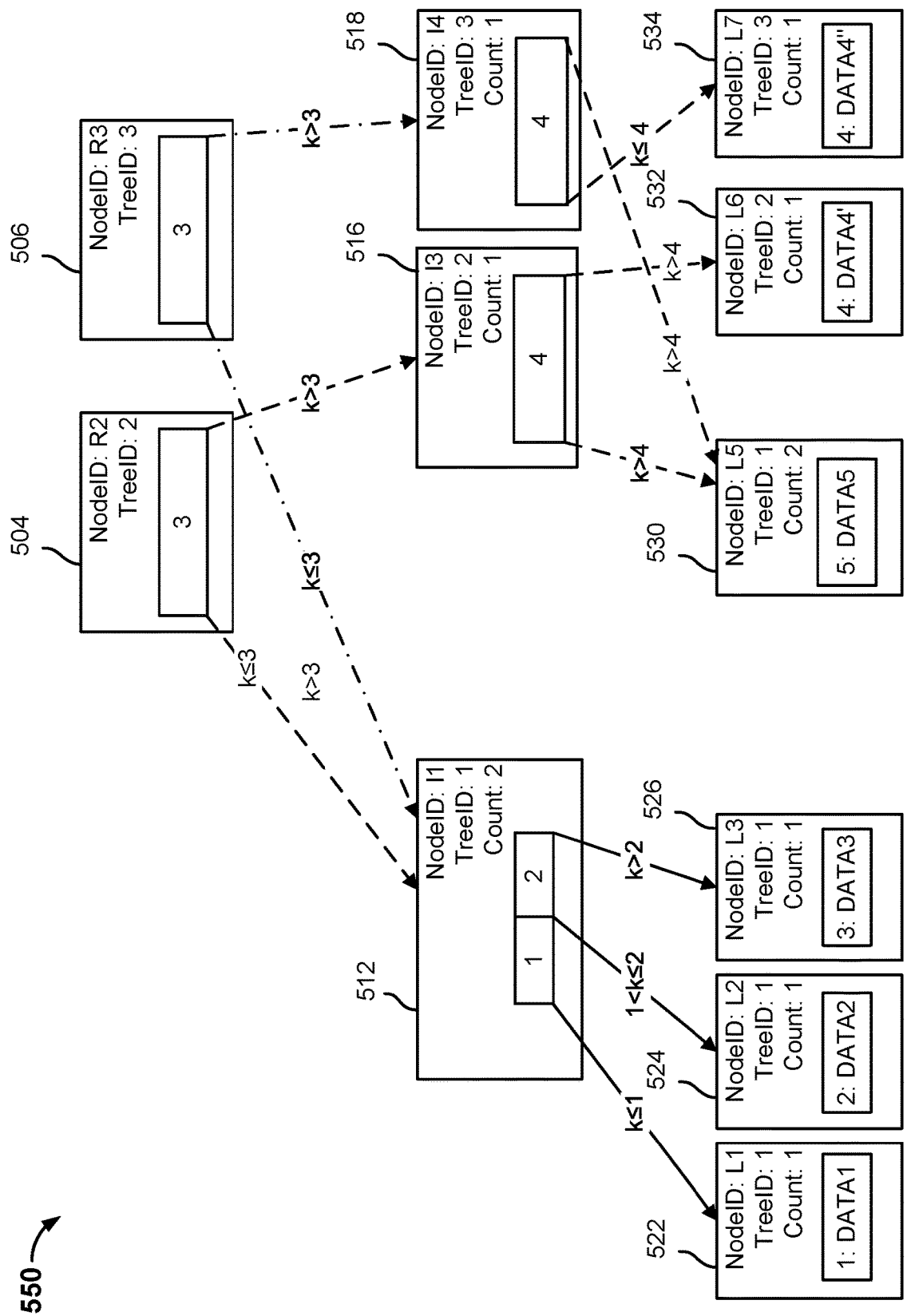

FIGS. 5A, 5B, 5C are block diagrams illustrating an embodiment of maintaining file system metadata snapshot trees. In the example shown, tree data structure 500 can be maintained by a storage system, such as secondary storage system 112. Tree data structure 500 is similar to tree data structure 280 except that the intermediate nodes and leaf nodes have an associated reference count value. A reference count value of a node may indicate a number of other nodes that include pointers to the node. A reference count value of a node may be incremented each time another node includes a pointer to the node.

For example, intermediate node 512 has a reference count value of "3" because root nodes 502, 504, 506 include pointers to intermediate node 512. Intermediate node 514 has a reference count value of "1" because root node 502 is the only node that includes a pointer to intermediate node 514. Intermediate nodes 516, 518 have a reference count value of "1" and "1," respectively. Leaf nodes 522, 524, 526, 528, 530, 532, and 534 have a reference count value of "1," "1," "1," "1," "3," "1," and "1," respectively.

A file system metadata snapshot tree may have an associated retention time policy associated with it. For example, a retention time policy may indicate that a file system metadata snapshot tree is to be deleted after a certain period of time (e.g., day(s), week(s), month(s), year(s), etc.). The retention time policy may reduce the number of file system metadata snapshot trees that a system is required to maintain and store in memory and/or storage. A file system metadata snapshot tree may be deleted, which may cause a file metadata tree pointed to by the deleted file system metadata snapshot tree and some or all of its associated data chunks to become unreferenced. The unreferenced file metadata tree may be stored in memory and/or storage until a garbage collection process removes the data associated with the unreferenced file metadata tree from memory and/or storage.

A file system metadata snapshot tree has an associated root node with a TreeID that associates the file system metadata snapshot tree with a particular moment in time. For example, a file system metadata snapshot tree associated with t=1 may have a root node with a TreeID of "1," a file system metadata snapshot tree associated with t=2 may have a root node with a TreeID of "2," and a file system metadata snapshot tree associated with t=3 may have a root node with a TreeID of "3."

In some embodiments, a retention time policy condition is satisfied (e.g., a file system metadata snapshot tree view has been stored in memory and/or storage for a particular amount of time) and it is determined to remove the file system metadata snapshot tree view from memory and/or storage. For example, it may be determined that a file system metadata snapshot tree with a particular TreeID is to be stored for a particular amount of time. In the event the particular amount of time has passed, a file system manager may determine that the file system metadata snapshot tree with the particular TreeID is to be removed from memory and/or storage. This reduces the storage needed to store file system metadata snapshot trees and corresponding backup snapshots because the data contained in a backup snapshot may not be needed after a certain amount of time has passed. To remove a file system metadata snapshot tree view from memory and/or storage, the file system metadata snapshot tree view is traversed along each branch and one or more nodes associated with the file system metadata snapshot tree view are removed based on a reference count value associated with a node.

FIG. 5B depicts an embodiment where a retention time policy condition associated with a TreeID has been satisfied. Suppose a file system metadata snapshot tree view associated with time t=1 is to be removed from memory and/or storage. To determine which nodes to remove, each branch associated with root node 502 is traversed because root node 502 has a TreeID of "1," which is the snapshot tree view associated with time t=1. Root node 502 may be traversed to intermediate node 512. A reference count value associated with intermediate node 512 is decremented by one. In this example, the reference count value associated with intermediate node 512 is decremented from "3" to "2." Because the reference count value associated with intermediate node 512 is not "0," then the reference count value of the associated leaf nodes 522, 524, 526 retain their current value of "1." However, if the reference count value associated with intermediate node 512 was "0," then the reference count values associated with leaf nodes 522, 524, and 526 would also be decremented, such that the reference count value would change from "1" to "0."

Root node 502 may be traversed to intermediate node 514. A reference count value associated with intermediate node 514 is decremented by one. In this example, the reference count value associated with intermediate node 514 is decremented from "1" to "0." Because the reference count value associated with intermediate node 514 is "0," then tree data structure 525 is further traversed to leaf nodes 528, 530. The reference count value associated with leaf node 528 is decremented from "1" to "0." The reference count value associated with leaf node 530 is decremented from "3" to "2."

After the file system metadata snapshot tree has been traversed, the root node associated with the file system metadata snapshot tree and any nodes having a reference count value of "0" associated with the file system metadata snapshot tree are removed from memory and/or storage. For example, as depicted in FIG. 5C, root node 502 is removed from memory because it is the root node associated with the file system metadata snapshot tree that is to be removed. Intermediate node 514 and leaf node 528 are removed from memory because their corresponding reference count values are "0." Leaf node 528 may include a pointer to a file metadata tree, for example, the file metadata tree depicted in FIG. 3A. As a result, a storage system may store an unreferenced file metadata tree. The unreferenced file metadata tree may include a plurality of leaf nodes with references to data chunks stored by the secondary storage system. As a result, some of the data chunks referenced by the plurality of leaf nodes may not be accessed.

Figure 6A:
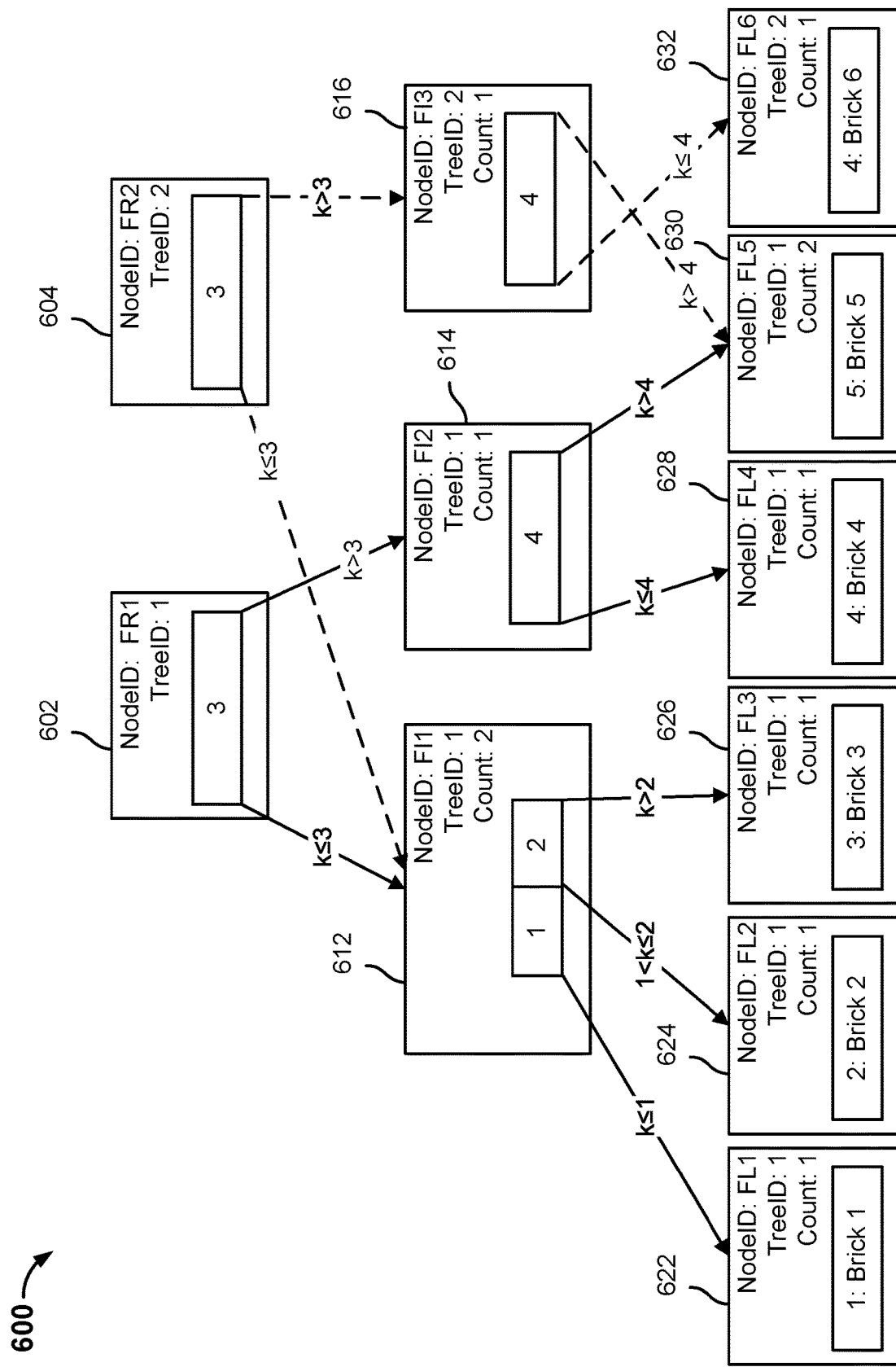
FIGS. 6A, 6B, 6C are block diagrams illustrating an embodiment of maintaining file metadata trees.
Figure 6B:
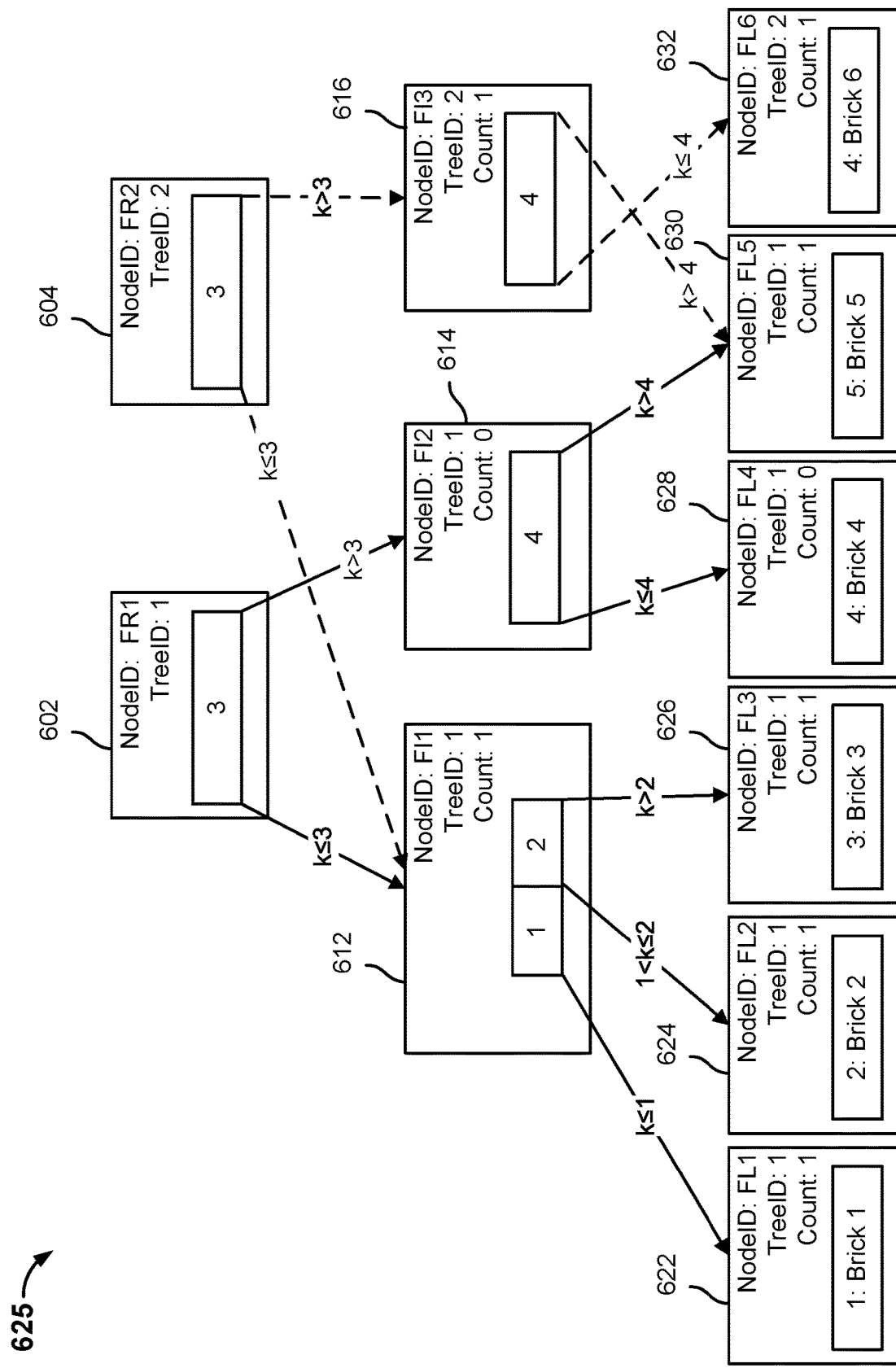
Figure 6C:
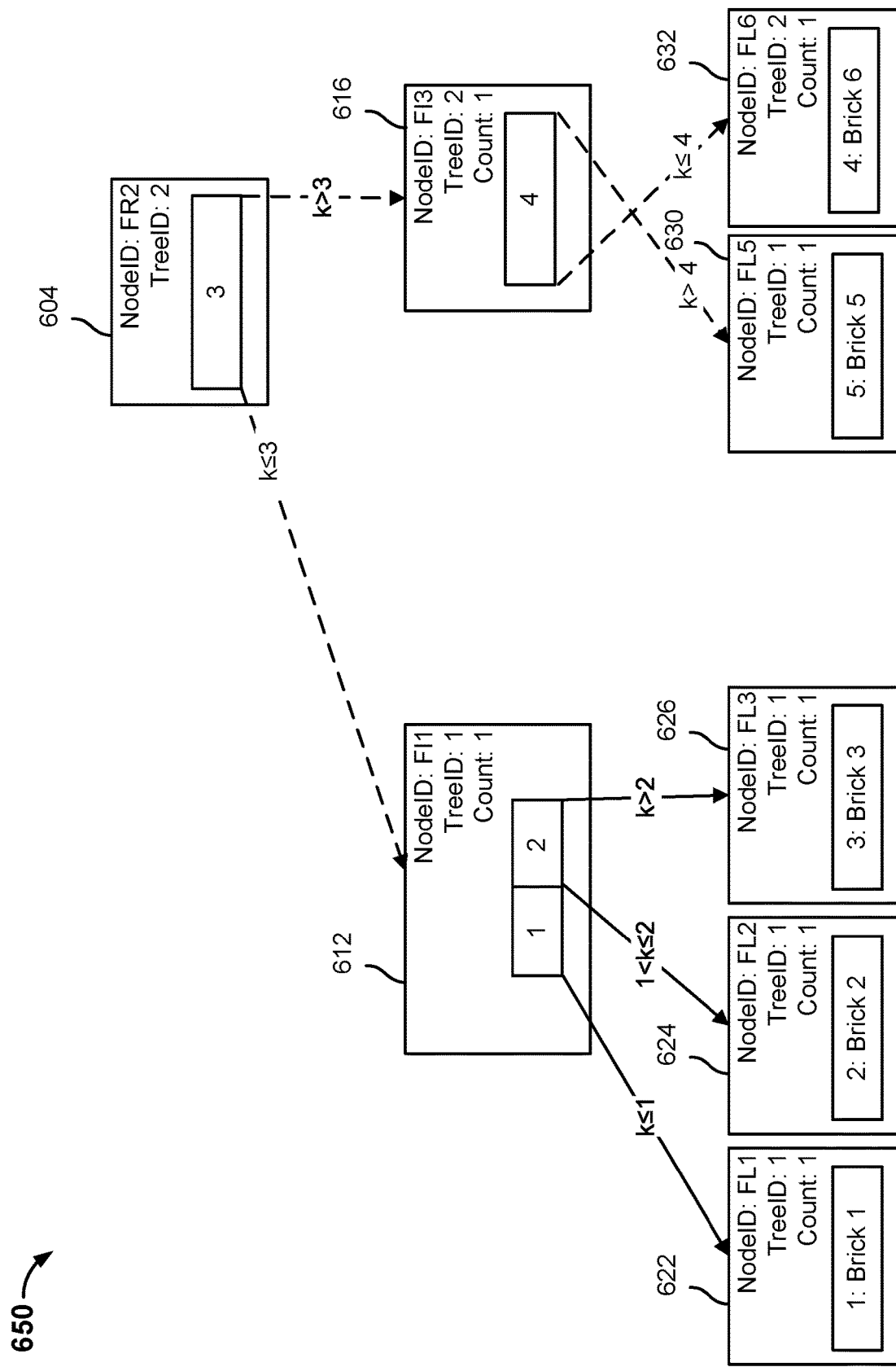

FIGS. 6A, 6B, 6C are block diagrams illustrating an embodiment of maintaining file metadata trees. In the example shown, tree data structure 600 can be maintained by a storage system, such as secondary storage system 112. Tree data structure 600 is similar to tree data structure 380 except that the intermediate nodes and leaf nodes have an associated reference count value. A reference count value of a node may indicate a number of other nodes that include pointers to the node. A reference count value of a node may be incremented each time another node includes a pointer to the node.

For example, intermediate node 612 has a reference count value of "2" because root nodes 602, 604 include pointers to intermediate node 612. Intermediate node 614 has a reference count value of "1" because root node 602 is the only node that includes a pointer to intermediate node 614. Intermediate nodes 616 has a reference count value of "1." Leaf nodes 622, 624, 626, 628, 630, and 632 have a reference count value of "1," "1," "1," "1," "2," and "1," respectively.

A version of a content file and its associated file metadata tree may have an associated retention time policy associated with them. For example, a retention time policy may indicate that a version of a content file and its associated file metadata tree are to be deleted after a certain period of time (e.g., day(s), week(s), month(s), year(s), etc.). In the event a retention time policy condition has been satisfied, the root node of a file metadata tree and any nodes with a reference count value of "0" of the file metadata tree may be removed from memory. Deleting the root node of the file metadata tree corresponding to the version of the file may cause one or more intermediate nodes and one or more leaf nodes to have a reference count of "0." The one or more leaf nodes with a reference count of "0" may store a corresponding brick identifier. A brick identifier may correspond to one or more data chunks associated with the version of the file. Deleting the one or more leaf nodes that have a reference count of "0" may cause the data chunks associated with the version of the file to become unreferenced.

A file metadata tree has an associated root node with a TreeID that associates the file metadata tree with a particular moment in time (e.g., a particular version of a content file). For example, a file metadata tree associated with t=1 (e.g., a first version of a content file) may have a root node with a TreeID of "1" and a file metadata tree associated with t=2 (e.g., a second version of the content file) may have a root node with a TreeID of "2."

In some embodiments, a retention time policy condition is satisfied (e.g., a version of a content file and its associated file metadata tree have been stored in memory and/or storage for a particular amount of time) and it is determined to remove the version of the file and its associated file metadata tree from memory and/or storage. To remove a file metadata tree from memory and/or storage, the file metadata tree is traversed and one or more nodes associated with the file metadata tree are removed based on a reference count value associated with a node.

FIG. 6B depicts an embodiment where a retention time policy condition associated with a TreeID has been satisfied. Suppose a file metadata tree associated with time t=1 (e.g., corresponding to a first version of a content file) is to be removed from memory and/or storage. To determine which nodes to remove, the branches associated with root node 602 are traversed because root node 602 has a TreeID of "1."

Root node 602 may be traversed to intermediate node 612. A reference count value associated with intermediate node 612 is decremented by one. In this example, the reference count value associated with intermediate node 612 is decremented from "2" to "1." Because the reference count value associated with intermediate node 612 is not "0," then the reference count value of the associated leaf nodes 622, 624, 626 retain their current value of "1." However, if the reference count value associated with intermediate node 612 was "0," then the reference count values associated with leaf nodes 622, 624, and 626 would also be decremented, such that the reference count value would change from "1" to "0."

Root node 602 may be traversed to intermediate node 614. A reference count value associated with intermediate node 614 is decremented by one. In this example, the reference count value associated with intermediate node 614 is decremented from "1" to "0." Because the reference count value associated with intermediate node 614 is "0," then tree data structure 625 is further traversed to leaf nodes 628, 630. The reference count value associated with leaf node 628 is decremented from "1" to "0." The reference count value associated with leaf node 630 is decremented from "2" to "1."

After the file metadata tree has been traversed, the root node associated with the file metadata tree and any nodes having a reference count value of "0" associated with the file metadata tree are removed from memory and/or storage. For example, as depicted in FIG. 6C, root node 602 is removed from memory because it is the root node associated with the file metadata tree that is to be removed. Intermediate node 614 and leaf node 628 are removed from memory because their corresponding reference count values are "0." Leaf node 628 may store a brick identifier that corresponds to one or more data chunks associated with the version of the file. Deleting leaf node 628 may cause one or more data chunks associated with the version of the file to become unreferenced.

FIG. 7A is a diagram illustrating a plurality of chunk files in accordance with some embodiments. Chunk files 700 may be stored by a storage system, such as secondary storage system 112.

In the example shown, a first chunk file F1 is comprised of data chunks 701, 702, 703, 704, 705, 706, 707, and 708, a second chunk file F2 is comprised of data chunks 711, 712, 713, 714, 715, 716, 717, and 718, and a third chunk file F3 is comprised of data chunks 721, 722, 723, 724, 725, 726, 727, and 728.

A content file may be comprised of a plurality of chunk files. In the example shown, chunk files "F1," "F2," and "F3" may be associated with the same content file. In other embodiments, chunk files "F1," "F2," and "F3" may be associated with different content files.

A data chunk included in a chunk file may be associated with one or more content files. A data chunk may have an associated reference count. The reference count may indicate a number of referenced file metadata trees that include a data brick associated with the data chunk. In some embodiments, the reference count is "0." This indicates that one or more unreferenced file metadata trees include corresponding references to the data chunk. A data chunk having a reference count of "0" is a data chunk that is to be deleted during a garbage collection and defragmentation process.

In some embodiments, the reference count is a value greater than "0." This indicates that one or more referenced file metadata trees include corresponding references to the data chunk. A data chunk having a reference count greater than "0" is a data chunk that is to be retained during a garbage collection and defragmentation process.

FIG. 7B is a diagram illustrating a plurality of chunk files in accordance with some embodiments. Chunk files 750 may be stored by a storage system, such as secondary storage system 112.

In the example shown, a first chunk file F1 is comprised of referenced data chunks 701, 703, 705, and 707, a second chunk file F2 is comprised of referenced data chunks 712, 715, and 718, and a third chunk file F3 is comprised of referenced data chunk 728.

First chunk file F1 was previously comprised of referenced data chunks 701, 702, 703, 704, 705, 706, 707, and 708, second chunk file F2 was previously comprised of referenced data chunks 711, 712, 713, 714, 715, 716, 717, and 718, and third chunk file F3 was previously comprised of referenced data chunks 721, 722, 723, 724, 725, 726, 727, and 728.

Data chunks 702, 704, 706, 708, 711, 713, 714, 716, 717, 721, 722, 723, 724, 725, 726, and 727 may correspond to data chunks with a reference count of "0." Those data chunks correspond to unreferenced data chunks.

A chunk file may be scored based on an amount of unreferenced data chunks included in the chunk file. The unreferenced data chunks correspond to storage that may be reclaimed after performing garbage collection and defragmentation. The chunk file score may indicate a percentage of the chunk file that includes unreferenced data chunk. For example, chunk file F1 may have a chunk file score of 50%, chunk file F2 may have a chunk file score of 62.5%, and chunk file F3 may have a chunk file score of 87.5%

Each chunk file stored by a secondary storage system may have an associated chunk file score. Fragmented chunk files (e.g., chunk files with a non-zero chunk score) may be grouped based on the primary owner associated with a chunk file. The primary owner associated with a fragmented chunk file may correspond to the original file metadata tree that includes references to the data chunks include in the chunk file.

A file metadata tree may be associated with a plurality of chunk files. For the primary owner, the associated fragmented chunk files may be sorted based on the chunk file score. A subset of the fragmented chunk files having the same primary owner (e.g., the same file metadata tree identifier) may be combined into a single chunk file. The subset of fragmented chunk files may include chunk files that have a chunk file score above a chunk file score threshold.

FIG. 7C is a diagram illustrating a combined chunk file in accordance with some embodiments. Chunk file 775 may be generated and stored by a storage system, such as secondary storage system 112.

In the example shown, fragmented chunk files F1, F2, and F3 were combined to generate chunk file F123. A chunk file may have a default size (e.g., 8 MB). In some embodiments, a plurality of fragmented chunk files are combined to generate a chunk file that has the default size. In other embodiments, a plurality of fragmented chunk files are combined to generate a chunk file that has a threshold percentage (e.g., 90%) of the default size. In other embodiments, the referenced data chunks of chunk files F2 and F3 replace the unreferenced data chunks of chunk file F1.

In other embodiments, the size of a chunk file is not limited to a particular size. A plurality of fragmented chunk files may be combined regardless of size of the combined chunk file. In other embodiments, fragmented chunk files that a chunk file score above the chunk file score threshold are combined.

After the combined chunk file is generated and the chunk files used to generate the combined chunk file are deleted, the chunk metadata table and the chunk file metadata table may be updated to reflect the changes. For example, a chunk metadata table may be updated such that data chunks 701, 703, 705, 707, 712, 715, 718, and 728 are associated with chunk file F123. A chunk file metadata table may be updated to reflect an offset of data chunks 701, 703, 705, 707, 712, 715, 718, and 728 within chunk file F123.

Figure 8:
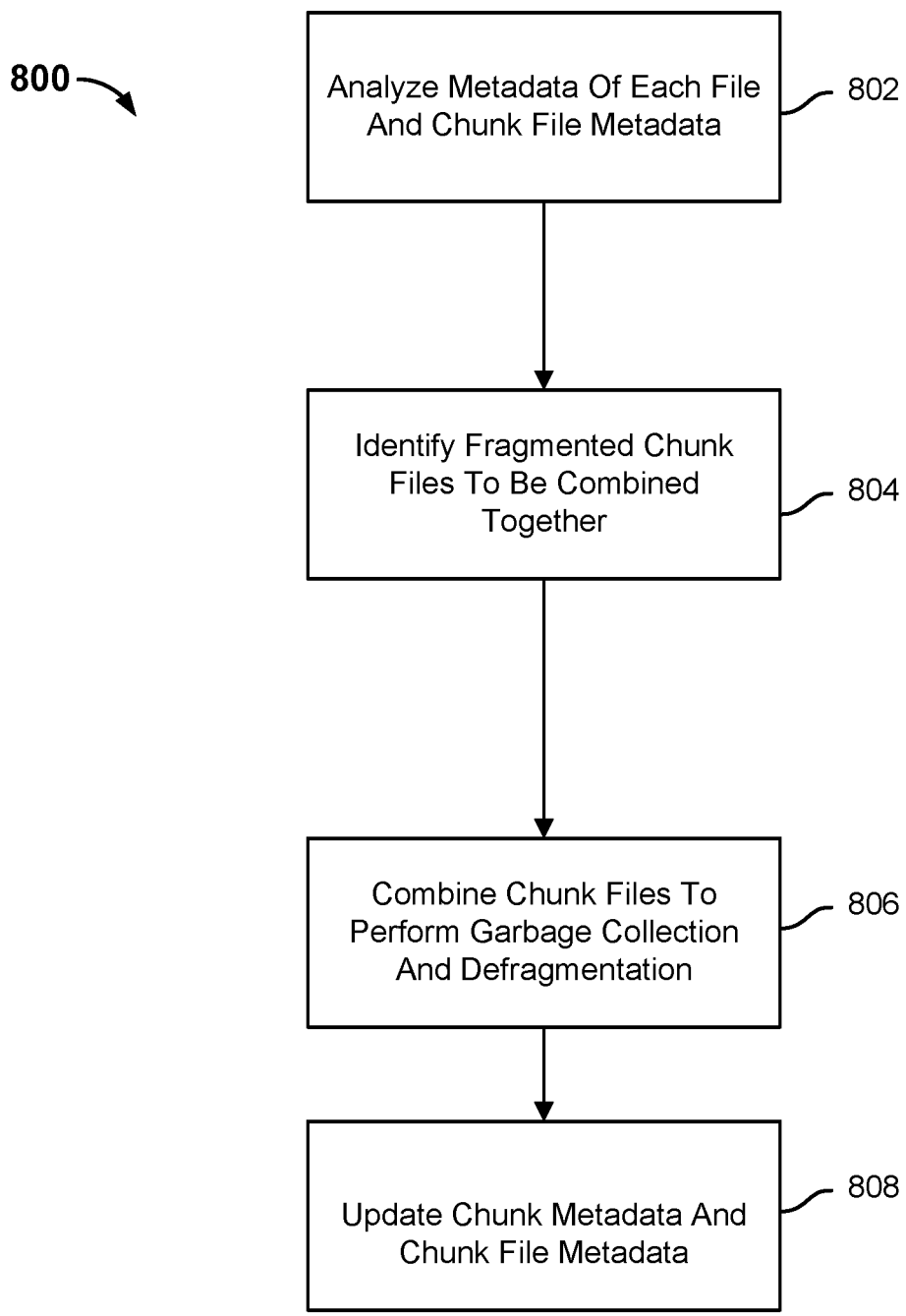
FIG. 8 is a flow chart illustrating a process for single pass garbage collection and defragmentation in accordance with some embodiments.

FIG. 8 is a flow chart illustrating a process for single pass garbage collection and defragmentation in accordance with some embodiments. Process 800 may be performed by a storage system, such as secondary storage system 112.

At 802, metadata of each file and chunk file metadata are analyzed. Metadata of each file of a group of files of a storage cluster and chunk file metadata may be analyzed to identify one or more file segment data chunks that are not referenced by the group of files of the storage. The one or more file segment data chunks that are not referenced may correspond to data chunks associated with a version of a file that was deleted (e.g., due to retention time policy condition)

The group of files of the storage cluster may have corresponding file metadata trees. A file metadata tree may be configured to store the metadata associated with a file. The data bricks associated with a plurality of file metadata trees may be scanned to determine a number of references associated with a data chunk. Some of the data chunks may be indirectly referenced by one or more file system metadata snapshot trees (e.g., a leaf node of a file system metadata snapshot tree includes a pointer to a root node of a file metadata tree and a leaf node of the file metadata tree includes a brick identifier associated with the data chunk). Some of the data chunks may not be referenced by any file system metadata snapshot tree (e.g., a leaf node of a file system metadata snapshot tree does not include a pointer to a root node of a file metadata tree) or any file metadata tree (e.g., a leaf node of a file metadata tree that referenced the data chunk has been deleted). A leaf node of a file metadata tree may store the value of a data brick that is associated with one or more data chunks. A chunk metadata table may be analyzed to determine a number of references associated with a data chunk based on a brick identifier and a chunk identifier. A chunk metadata table may be configured to associate a brick identifier with a chunk identifier and a chunk file identifier. One or more data bricks may be associated with a chunk identifier. A chunk identifier may be associated with a data chunk. The number of references associated with a data chunk may be the number of data bricks that are associated with a chunk identifier of a data chunk. A reference count may be determined for each data chunk.

A chunk file metadata table may be scanned to identify the one or more chunk files that include the one or more unreferenced data chunks. A chunk file metadata table may be configured to associate a chunk file having a particular chunk file identifier with a chunk identifier, a chunk file offset, a storage node, and a primary owner.

At 804, fragmented chunk files to be combined together are identified. A list of unreferenced data chunks may be used to determine the one or more chunk files that include unreferenced data chunks and corresponding locations of the unreferenced data chunks. Each chunk file may have a corresponding chunk file score that indicates an amount of unreferenced data chunks included in the chunk file. The chunk file score may indicate a percentage of the chunk file that includes unreferenced data chunks. The chunk file score may correspond to an amount of memory and/or storage that may be reclaimed through defragmentation.

The plurality of chunk files may be grouped based on a file metadata tree identifier. The plurality of chunk files may be separated into a plurality of groups. A file metadata tree may correspond to a content file and the file metadata tree may have an associated identifier. The data chunks of the content file may be stored in a plurality of chunk files. The plurality of chunk files having the same file metadata tree identifier may be sorted based on the chunk file score.

At 806, one or more chunk files are combined to perform a single pass garbage collection and defragmentation. A subset of the fragmented chunk files having the same file metadata tree identifier may be combined into a combined chunk file. The subset of fragmented chunk files may include chunk files that have a chunk file score above a chunk file score threshold. The subset of fragmented files that were used to generate the combined chunk file may be deleted after the combined chunk file is generated. In some embodiments, a new chunk file combines the referenced data chunks associated with a plurality of chunk files. In other embodiments, the referenced data chunks associated with a plurality of chunk files replace unreferenced data chunks associated with an existing chunk file.

At 808, chunk metadata and chunk file metadata are updated. The chunk file metadata may be updated with an update that concurrently reflects the removal of at least a portion of the one or more file segment data chunks that are not referenced by the group of files and the combination of the identified fragmented chunk files. After the combined chunk files are generated, the chunk metadata table and the chunk file metadata table may be updated to reflect the changes. For example, a chunk having a particular chunk identifier may have been previously part of a fragmented chunk file that was used to generate a combined chunk file. An entry of the chunk metadata table may be updated to reflect that the chunk identifier is associated with the combined chunk file instead of the deleted fragmented chunk file. A chunk file metadata table may be updated to reflect a location of a chunk having the chunk identifier within the combined chunk file.

Figure 9:
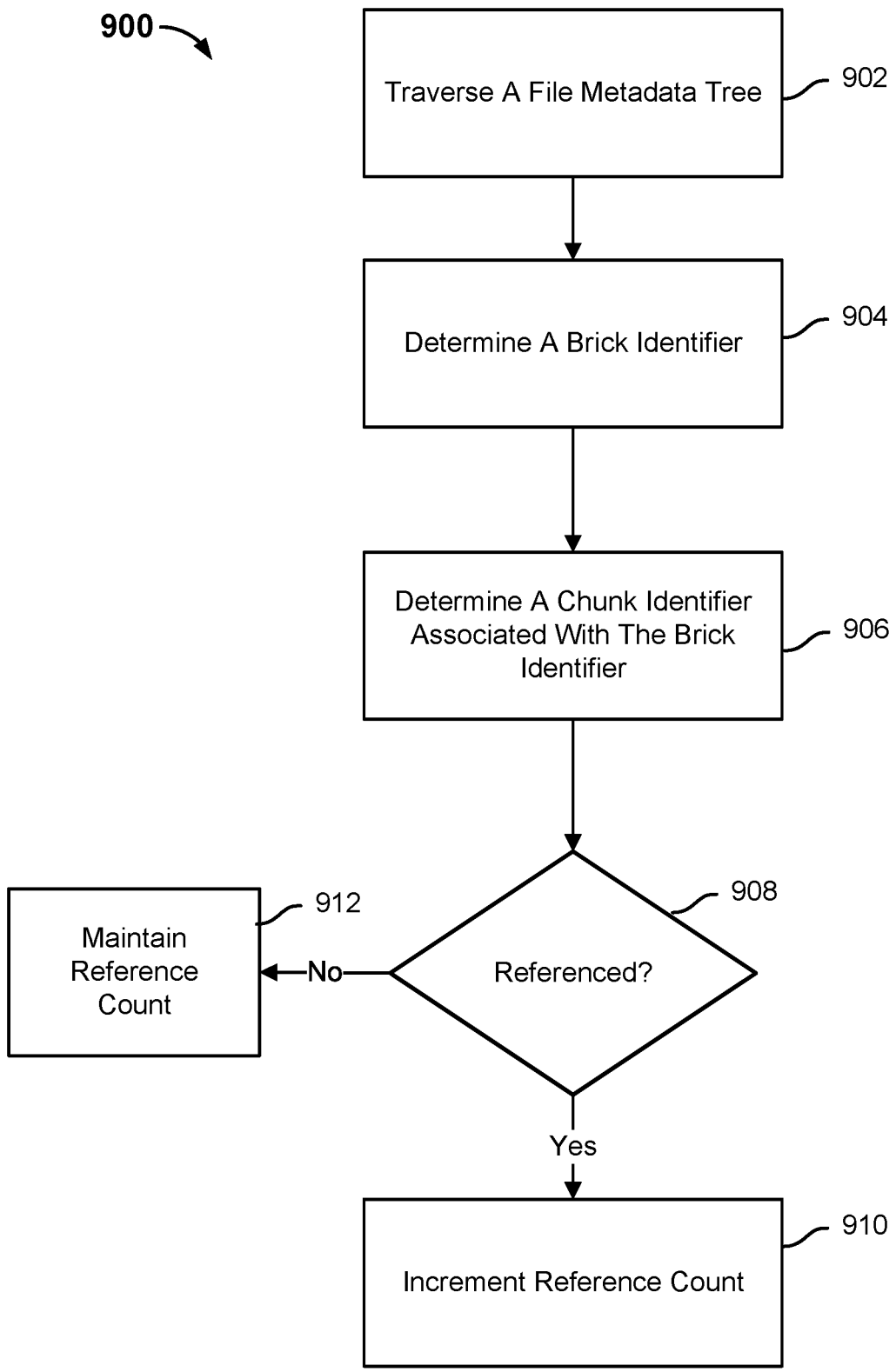
FIG. 9 is a flow chart illustrating an embodiment of a process for determining a reference count associated with a data chunk.

FIG. 9 is a flow chart illustrating an embodiment of a process for determining a reference count associated with a data chunk. Process 900 may be performed by a storage system, such as secondary storage system 112. Process 900 may be implemented to perform some or all of step 802 of process 800.

At 902, a file metadata tree is traversed. A file metadata tree may include a root node, one or more levels of one or more intermediate nodes associated with the root node, and one or more leaf nodes associated with an intermediate node of the lowest intermediate level. A file metadata tree may correspond to a content file stored by a storage system. A file system metadata snapshot tree may include a leaf node that stores a pointer to a file metadata tree. A file metadata tree is a referenced file metadata tree in the event at least one file system metadata snapshot tree includes a reference (e.g., pointer) to the file metadata tree. A file metadata tree is an unreferenced file metadata tree in the event no file system metadata snapshot trees include references to the file metadata tree.

At 904, a brick identifier is determined. A leaf node of a file metadata tree may include an identifier of a data brick associated with one or more data chunks of the content file. A data brick may be associated with one or more chunk identifiers (e.g., SHA-1). The file metadata tree may traversed to a leaf node to determine the brick identifier.

At 906, a chunk identifier associated with the brick identifier is determined. A chunk metadata table may store information that associates a brick identifier with one or more chunk identifiers and one or more chunk file identifiers. The determined brick identifier may be used to determine a chunk identifier (e.g., SHA-1). The chunk identifier is associated with a data chunk.

At 908, it is determined whether the data chunk associated with the chunk identifier is associated with a referenced file metadata tree or an unreferenced file metadata tree. In the event the data chunk associated with the chunk identifier is associated with a referenced file metadata tree, process 900 proceeds to 910 and a reference count associated with the data chunk is incremented. In the event the data chunk associated with the chunk identifier is associated with a referenced file metadata tree, process 900 proceeds to 912 and a reference count associated with the data chunk is maintained.

Figure 10:
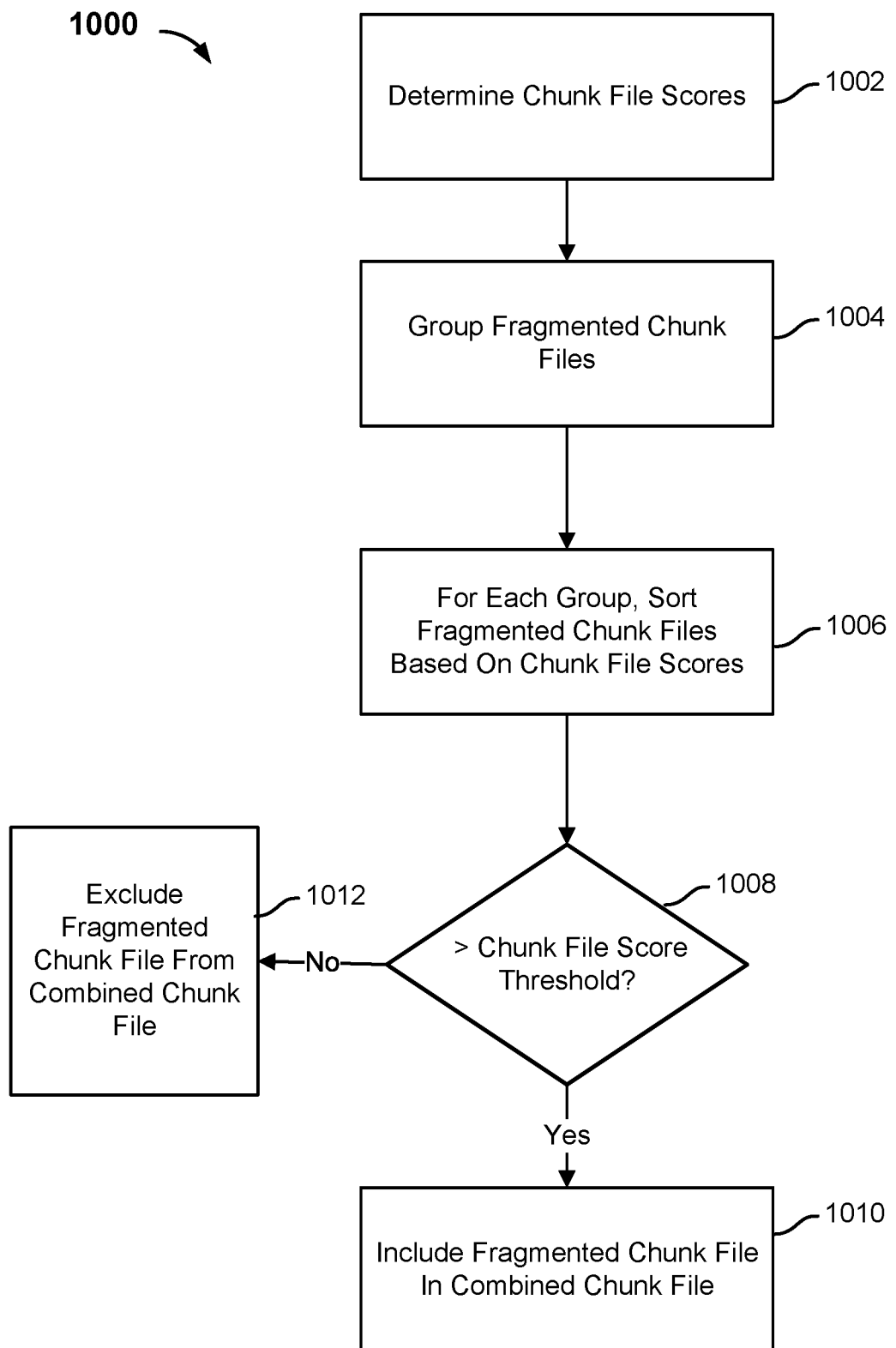
FIG. 10 is a flow chart illustrating a process for identifying fragmented chunk files to be combined together in accordance with some embodiments.

FIG. 10 is a flow chart illustrating a process for identifying fragmented chunk files to be combined together in accordance with some embodiments. Process 1000 may be implemented by a storage system, such as secondary storage system 112. Process 1000 may be used to perform some or all of step 804 of process 800.

At 1002, a chunk file score is determined for all of the chunk files stored by a storage system. The chunk file score may indicate an amount or a percentage of the chunk file that includes unreferenced data chunks.

At 1004, fragmented chunk files are grouped based on an associated file metadata tree identifier. A file metadata tree may correspond to a content file and the file metadata tree may have an associated identifier. A file metadata tree may be associated with a plurality of chunk files because the data chunks of the content file may be stored in a plurality of chunk files. One or more of the chunk files may be fragmented chunk files.

At 1006, for each group, the fragmented chunk files are sorted based on chunk file scores.

At 1008, it is determined whether a chunk file score for a fragmented chunk file is greater than a chunk file score threshold. In the event the chunk file score for a fragmented chunk file is greater than the chunk file score threshold, process 1000 proceeds to 1010 and the fragmented chunk file is included in the combined chunk file. In some embodiments, a subset of the chunk files having a chunk file score above the chunk file score threshold are selected to be part of the combined chunk file. In the event the chunk file score for a fragmented chunk file is not greater than the chunk file score threshold, process 1000 proceeds to 1012 and the fragmented chunk file is excluded from the combined chunk file.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
scan a plurality of tree data structures corresponding to a plurality of files of a storage to identify a corresponding number of references associated with file segment data chunks included in the plurality of files, wherein the plurality of tree data structures store corresponding metadata for the plurality of files;

analyze the plurality of scanned tree data structures corresponding to the plurality of files and chunk file metadata, wherein to analyze the plurality of scanned tree data structures corresponding to the plurality of files and the chunk file metadata, the processor is configured to:

identify one or more file segment data chunks that are not referenced by the plurality of files of the storage based on an analysis of the corresponding scanned tree data structure associated with each file of the plurality of files, wherein the one or more file segment data chunk are identified as the one or more file segment data chunks that are not referenced by the plurality of files of the storage based on a corresponding reference count, wherein the corresponding reference count indicates a number of tree data structures that reference a file segment data chunk; and identify fragmented chunk files to be combined together based at least in part on the one or more identified file segment data chunks, wherein the fragmented chunk files are identified based on an amount of unreferenced data chunks included in a chunk file;

combine file segment data chunks that are referenced by a group of files of the identified fragmented chunk files into one or more combined chunk files; and update the chunk file metadata with an update that concurrently reflects a removal of at least a portion of the one or more file segment data chunks that are not referenced by the group of files and the combination of the identified fragmented chunk files; and a memory coupled to the processor and configured to provide the processor with instructions.

2. The system of claim 1, wherein the processor is further configured to generate one of the one or more combined chunk files using at least two of the identified fragmented chunk files.

3. The system of claim 2, wherein the processor is further configured to delete the at least two of the identified fragmented chunk files after the one of the one or more combined chunk files are generated.

4. The system of claim 1, wherein the processor is further configured to group the identified fragmented chunk files into a plurality of groups based on a corresponding file associated with the identified fragmented chunk files.

5. The system of claim 4, wherein for a group of the plurality of groups, the processor is further configured to sort the identified fragmented chunk files included in the group based on a corresponding chunk file score.

6. The system of claim 5, wherein the corresponding chunk file score indicates an amount of storage to be reclaimed in the event a fragmented chunk file is used for a combined chunk file.

7. The system of claim 1, wherein to identify one or more file segment data chunks that are not referenced by the plurality of files of the storage, the processor is configured to traverse the corresponding tree data structure associated with each file of the plurality of files.

8. The system of claim 7, wherein the processor is further configured to determine a chunk identifier and a chunk file identifier based on a traversal of the corresponding tree data structure.

9. The system of claim 8, wherein the chunk identifier is associated with a file segment data chunk, wherein the file segment data chunk has the corresponding reference count.

10. The system of claim 9, wherein a fragmented chunk file of the fragmented chunk files includes at least one data chunk with the corresponding reference count being zero.

11. The system of claim 1, wherein the processor is further configured to update chunk metadata based on the combined chunk files.

12. A method, comprising:
scanning a plurality of tree data structures corresponding to a plurality of files of a storage to identify a corresponding number of references associated with file segment data chunks included in the plurality of files, wherein the plurality of tree data structures store corresponding metadata for the plurality of files;
analyzing the plurality of scanned tree data structures corresponding to the plurality of files and chunk file metadata, wherein analyzing the plurality of scanned tree data structures corresponding to the plurality of files and the chunk file metadata comprises:
identifying one or more file segment data chunks that are not referenced by the plurality of files of the storage based on an analysis of the corresponding scanned tree data structure associated with each file of the plurality of files, wherein the one or more file segment data chunk are identified as the one or more file segment data chunks that are not referenced by the plurality of files of the storage based on a corresponding reference count, wherein the corresponding reference count indicates a number of tree data structures that reference a file segment data chunk; and
identifying fragmented chunk files to be combined together based at least in part on the one or more identified file segment data chunks, wherein the fragmented chunk files are identified based an amount of unreferenced data chunks included in a chunk file;
combining file segment data chunks that are referenced by a group of files of the identified fragmented chunk files into one or more combined chunk files; and
updating the chunk file metadata with an update that concurrently reflects a removal of at least a portion of the one or more file segment data chunks that are not referenced by the group of files and the combination of the identified fragmented chunk files.

13. The method of claim 12, further comprising generating one of the one or more combined chunk files based on the identified fragmented chunk files.

14. The method of claim 13, wherein the fragmented chunk files to be combined together are identified based on a corresponding chunk file score.

15. The method of claim 14, wherein the corresponding chunk file score indicates an amount or percentage that a chunk file includes unreferenced data chunks.

16. The method of claim 13, further comprising deleting the identified fragmented chunk files that were used to generate the combined chunk file.

17. The method of claim 12, further comprising:
grouping the identified fragmented chunk files based on a file associated with the identified fragmented chunk file; and
for each group, sorting the identified fragmented chunk files based on their corresponding chunk file scores.

18. The method of claim 13, further comprising updating chunk metadata based on the combined chunks files.

19. A computer program product, the computer program product being embodied in a non-transitory computer readable storage medium and comprising computer instructions for:
scanning a plurality of tree data structures corresponding to a plurality of files of a storage to identify a corresponding number of references associated with file segment data chunks included in the plurality of files, wherein the plurality of tree data structures store corresponding metadata for the plurality of files;
analyzing the plurality of scanned tree data structures corresponding to the plurality of files and chunk file metadata, wherein analyzing the plurality of scanned tree data structures corresponding to the plurality of files and the chunk file metadata comprises:
identifying one or more file segment data chunks that are not referenced by the plurality of files of the storage based on an analysis of the corresponding scanned tree data structure associated with each file of the plurality of files, wherein the one or more file segment data chunk are identified as the one or more file segment data chunks that are not referenced by the plurality of files of the storage based on a corresponding reference count, wherein the corresponding reference count indicates a number of tree data structures that reference a file segment data chunk; and
identifying fragmented chunk files to be combined together based at least in part on the one or more identified file segment data chunks, wherein the fragmented chunk files are identified based on an amount of unreferenced data chunks included in a chunk file;
combining file segment data chunks that are referenced by a group of files of the identified fragmented chunk files into one or more combined chunk files; and
updating the chunk file metadata with an update that concurrently reflects a removal of at least a portion of the one or more file segment data chunks that are not referenced by the group of files and the combination of the identified fragmented chunk files.

* * * * *

UNITED STATES PATENT AND TRADEMARK OFFICE
CERTIFICATE OF CORRECTION

PATENT NO.         : 10,706,014 B1
APPLICATION NO.    : 16/279780
DATED              : July 7, 2020
INVENTOR(S)        : Anubhav Gupta and Anirvan Duttagupta Page 1 of 1

It is certified that error appears in the above-identified patent and that said Letters Patent is hereby corrected as shown below:

In the Specification

In Column 19, Line(s) 3, delete ""SHA-1a"" and insert --"SHA-1n"--, therefor.

Signed and Sealed this
First Day of December, 2020

Andrei Iancu
*Director of the United States Patent and Trademark Office*